US012697870B2

(12) United States Patent
Zhao et al.

(10) Patent No.: US 12,697,870 B2
(45) Date of Patent: Aug. 4, 2026

(54) VEHICLE AND DOUBLE-MOTOR ELECTRIC DRIVE ASSEMBLY THEREOF

(71) Applicants:WUXI INFIMOTION PROPULSION TECHNOLOGY CO., LTD., Wuxi (CN); WUXI INFIMOTION TECHNOLOGY CO., LTD., Wuxi (CN)

(72) Inventors: Yuting Zhao, Wuxi (CN); Xiaohua Cai, Wuxi (CN); Tianbao Tang, Wuxi (CN); Youdi Shi, Wuxi (CN); Junfeng Hu, Wuxi (CN); Guanghai Ye, Wuxi (CN); Chuang Yu, Wuxi (CN); Haisheng Yu, Wuxi (CN); Xiaozhe Lin, Wuxi (CN)

(73) Assignees: WUXI INFIMOTION PROPULSION TECHNOLOGY CO., LTD., Wuxi (CN); WUXI INFIMOTION TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 19/070,467

(22) Filed: Mar. 4, 2025

(65) Prior Publication Data

US 2025/0196627 A1     Jun. 19, 2025

Related U.S. Application Data

(63) Continuation of application No. PCT/CN2023/125455, filed on Oct. 19, 2023.

(30) Foreign Application Priority Data

Dec. 26, 2022     (CN) .......................... 202211679016.0
Dec. 27, 2022     (CN) .......................... 202211690423.1

(51) Int. Cl.
*B60K 17/04*     (2006.01)
*B60K 7/00*     (2006.01)
*F16H 57/00*     (2012.01)

(52) U.S. Cl.
CPC .......... *B60K 17/046* (2013.01); *B60K 7/0007* (2013.01); *B60K 2007/0092* (2013.01); *F16H 57/0006* (2013.01)

(58) Field of Classification Search
CPC ...... B60K 1/02; B60K 17/046; B60K 7/0007; B60K 2007/0092; B60K 2007/0046
See application file for complete search history.

(56) References Cited

U.S. PATENT DOCUMENTS 7,441,623 B2 * 10/2008 Casey .................. B60K 17/046
                                                            180/243
7,442,141 B2 * 10/2008 Yamauchi ............... B60L 50/52
                                                            475/6

(Continued)

FOREIGN PATENT DOCUMENTS

CN          1397103 A       2/2003
CN        107289068 A      10/2017

(Continued)

OTHER PUBLICATIONS

International Search Report dated Dec. 22, 2023 in International Application No. PCT/CN2023/125455. English translation attached.

(Continued)

*Primary Examiner* — Derek D Knight

(57)          ABSTRACT

Provided is a vehicle and a double-motor electric drive assembly thereof. The double-motor electric drive assembly includes a first drive mechanism and a second drive mechanism that are located at one drive axle. The first drive mechanism includes a first motor, a first planetary gear mechanism, and a first half shaft that are connected sequentially. The second drive mechanism includes a second motor, (Continued)

a second planetary gear mechanism, and a second half shaft that are connected sequentially. The first planetary gear mechanism has a different structure from the second planetary gear mechanism.

16 Claims, 6 Drawing Sheets

(56) References Cited

U.S. PATENT DOCUMENTS

| | | | | |
|---|---|---|---|---|
| 9,908,434 | B2 * | 3/2018 | Konishi | B60L 15/2054 |
| 9,945,446 | B2 * | 4/2018 | Hiramatsu | B60K 6/54 |
| 10,703,201 | B2 * | 7/2020 | Bassis | B60K 7/0007 |
| 10,982,745 | B2 * | 4/2021 | Holmes | B60K 1/00 |
| 11,752,862 | B2 * | 9/2023 | Wang | B60K 1/02 |
| | | | | 475/150 |
| 2012/0161497 | A1 * | 6/2012 | He | B60L 50/30 |
| | | | | 301/6.5 |
| 2018/0009435 | A1 | 1/2018 | Jeong et al. | |
| 2022/0410684 | A1 * | 12/2022 | Wang | B60K 23/04 |
| 2024/0051387 | A1 * | 2/2024 | Yang | B60K 17/046 |

FOREIGN PATENT DOCUMENTS

| | | | |
|---|---|---|---|
| CN | 107339399 | A | 11/2017 |
| CN | 207931389 | U | 10/2018 |
| CN | 109484163 | A | 3/2019 |
| CN | 109835157 | A | 6/2019 |
| CN | 113858930 | A | 12/2021 |
| CN | 114718992 | A | 7/2022 |
| CN | 114851831 | A | 8/2022 |
| CN | 115042560 | A | 9/2022 |
| CN | 217401609 | U | 9/2022 |
| CN | 115139772 | A | 10/2022 |
| CN | 116176249 | A | 5/2023 |
| CN | 116394732 | A | 7/2023 |
| DE | 102011017056 | A1 | 10/2012 |
| DE | 102018219521 | A1 | 5/2020 |
| EP | 3403873 | A1 | 11/2018 |
| JP | 2005138824 | A | 6/2005 |
| JP | 2019035419 | A | 3/2019 |
| KR | 102480922 | B1 | 12/2022 |
| WO | 2012139567 | A2 | 10/2012 |

OTHER PUBLICATIONS

First Office Action dated Oct. 28, 2025 received in corresponding patent family application No. CN202211679016.0. English translation attached.

First Office Action dated Feb. 5, 2026 received in corresponding patent family application No. CN202211690423.1. English translation attached.

Extended European Search Report dated Feb. 13, 2026 received in corresponding patent family European Application No. EP23909505. 2.

Chen, Zhoujuan et al., "Principles of Machinery", Huazhong University of Science and Technology, Feb. 28, 2014, pp. 154-156.

Notice of Reasons for Refusal dated May 19, 2026 received in corresponding patent family application No. JP2025516029. English translation attached.

* cited by examiner

1

VEHICLE AND DOUBLE-MOTOR ELECTRIC DRIVE ASSEMBLY THEREOF

CROSS-REFERENCE TO RELATED APPLICATION

This application is a continuation of International Application No. PCT/CN2023/125455, filed on Oct. 19, 2023, which claims priority to Chinese Patent Applications No. 202211679016.0 filed on Dec. 26, 2022 and entitled "VEHICLE AND DOUBLE-MOTOR ELECTRIC DRIVE ASSEMBLY THEREOF", and No. 202211690423.1 filed on Dec. 27, 2022 and entitled "VEHICLE AND DOUBLE-MOTOR ELECTRIC DRIVE ASSEMBLY THEREOF", the entire disclosure of which are incorporated herein by reference.

FIELD

The present disclosure relates to an electric vehicle technology, and in particular to a vehicle and a double-motor electric drive assembly thereof.

BACKGROUND

At present, with the development of new energy vehicle industry, electric vehicles have become a development trend. Performance of the electric vehicles is attracting more and more attention. Due to limitations in development of motor technology, an electric drive assembly currently using a single motor has an increased size and weight when reaching high power, which limits the development of high-performance electric vehicles. Meanwhile, under a background that consumers are paying more and more attention to the performance, the demand for power configurations such as vector control and differential lock is ever-increasing. In a single-motor transmission system, it is necessary to add a large number of mechanical mechanisms to realize these functions, which cannot reduce both size and weight of a single motor assembly.

Therefore, an electric drive assembly using double motors has increasingly become the focus of attention. By using two motors and their corresponding transmission systems, requirements for the high-performance electric vehicle are satisfied. Meanwhile, since each motor is equipped with a transmission system, the entire power assembly is more flexible in layout, allowing for distributed placement of the two systems.

However, compared with the single-motor electric drive assembly, a double-motor electric drive assembly in the related art has overlapping orders and louder noise, resulting in a reduction in noise, vibration, harshness (NVH) performance of the vehicle.

SUMMARY

The following description is a summary of the subject matter described in detail herein. This summary is not intended to limit the scope of the claims.

Embodiments of the present disclosure provide a double-motor electric drive assembly, which includes a first drive mechanism and a second drive mechanism. The first drive mechanism includes a first motor, a first planetary gear mechanism, and a first half shaft that are connected sequentially. The second drive mechanism includes a second motor, a second planetary gear mechanism, and a second half shaft that are connected sequentially. The first planetary gear mechanism has a different structure from the second planetary gear mechanism.

Embodiments of the present disclosure also provide another double-motor electric drive assembly. The double-motor electric drive assembly includes a first drive mechanism and a second drive mechanism. The first drive mechanism includes a first motor, a first gear transmission mechanism, and a first half shaft that are sequentially in transmission connection with each other. The second drive mechanism includes a second motor, a second gear transmission mechanism, and a second half shaft that are sequentially in transmission connection with each other. Gears of the first gear transmission mechanism are arranged with respect to gears of the second gear transmission mechanism in a positionally symmetrical manner. The numbers of teeth of at least two gears of the gears arranged symmetrically with respect to each other are different.

Embodiments of the present disclosure also provide another double-motor electric drive assembly. The double-motor electric drive assembly includes a first drive mechanism and a second drive mechanism that are located at one drive axle. The first drive mechanism includes a first motor, a first planetary gear mechanism, and a first half shaft that are connected sequentially. The second drive mechanism includes a second motor, a second planetary gear mechanism, and a second half shaft that are connected sequentially. The first planetary gear mechanism has a different gear arrangement pattern from the second planetary gear mechanism.

Embodiments of the present disclosure also provide a vehicle. The vehicle includes the double-motor electric drive assembly as described above.

Other features and advantages of the present disclosure will be set forth in the following specification, and will become apparent in part from the specification, or will be learned by implementing the present disclosure. Other advantages of the present disclosure may be realized and obtained by the solutions described in the specification and the accompanying drawings.

Other aspects may be apparent upon reading and understanding the drawings and detailed descriptions.

DETAILED DESCRIPTION

First Embodiment

Figure 1:
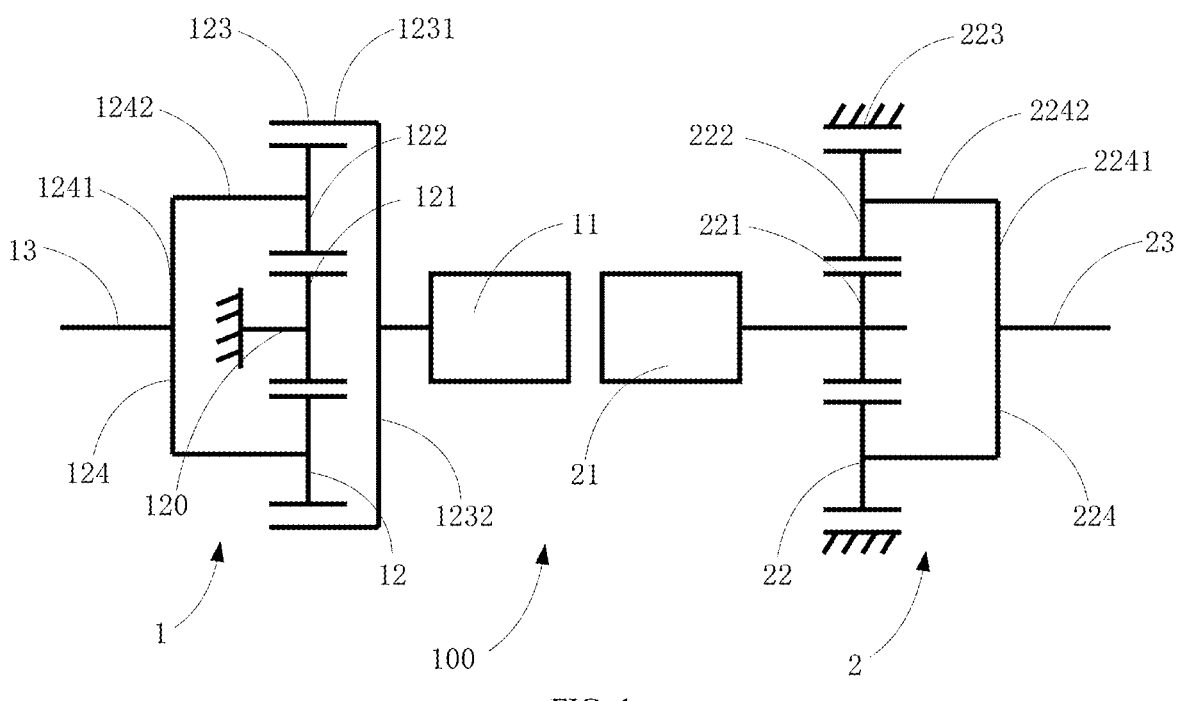
FIG. 1 is a schematic view of a double-motor electric drive assembly according to a first embodiment of the present disclosure.

As illustrated in FIG. 1, FIG. 1 illustrates a structure of a double-motor electric drive assembly 100 according to the first embodiment. The double-motor electric drive assembly 100 is mounted on a vehicle and provides the vehicle with driving power. The vehicle may be a pure electric vehicle.

The double-motor electric drive assembly 100 includes a first drive mechanism 1 and a second drive mechanism 2. The first drive mechanism 1 and the second drive mechanism 2 may be provided at one drive axle.

The first drive mechanism 1 includes a first motor 11, a first planetary gear mechanism 12, and a first half shaft 13. The first planetary gear mechanism 12 is provided between the first half shaft 13 and the first motor 11. A main shaft of the first motor 11 is connected to the first planetary gear mechanism 12, and the first planetary gear mechanism 12 is connected to the first half shaft 13. The first planetary gear mechanism 12 may be a speed reducer. After reducing a speed of a torque outputted by the first motor 11 and increasing the outputted torque, the first planetary gear mechanism 12 may transmit the torque to the first half shaft 13 to drive the first half shaft 13 to rotate.

The second drive mechanism 2 includes a second motor 21, a second planetary gear mechanism 22, and a second half shaft 23. The second planetary gear mechanism 22 is provided between the second half shaft 23 and the second motor 21. A main shaft of the second motor 21 is connected to the second planetary gear mechanism 22, and the second planetary gear mechanism 22 is connected to the second half shaft 23. The second planetary gear mechanism 22 may be a speed reducer. After reducing a speed of a torque outputted by second motor 21 and increasing the outputted torque, the second planetary gear mechanism 22 may transmit the torque to the second half shaft 23 to drive the second half shaft 23 to rotate. The first motor 11 and the second motor 21 are provided between the first planetary gear mechanism 12 and the second planetary gear mechanism 22. The first half shaft 13 is provided at a side of the first planetary gear mechanism 12 facing away from the second planetary gear mechanism 22, and the second half shaft 23 is provided at a side of the second planetary gear mechanism 22 facing away from the first planetary gear mechanism 12. The first half shaft 13, the second half shaft 23, the main shaft of the first motor 11, and the main shaft of the second motor 21 are arranged coaxially. The first planetary gear mechanism has a different structure from the second planetary gear mechanism.

Since the first planetary gear mechanism 12 has the different structure from the second planetary gear mechanism 22, an order separation of the first planetary gear mechanism 12 and the second planetary gear mechanism 22 can be realized, thereby avoiding an order overlap of the first planetary gear mechanism 12 and the second planetary gear mechanism 22. As a result, order noise when the first planetary gear mechanism 12 and the second planetary gear mechanism 22 operate simultaneously can be significantly reduced, improving NVH performance of the vehicle and obtaining a better driving experience. Meanwhile, the first motor 11 and the second motor 21 may each be a motor with low power. When the first motor 11 and the second motor 21 operate simultaneously, the double-motor electric drive assembly 100 may output larger power to satisfy high-power output requirements of the vehicle. Since the first motor 11 and the second motor 21 may be controlled separately, power output at a side or two sides of the vehicle may be changed as power requirements, to realize functions of vehicle differential speed, differential lock, vector control, and the like, making control more accurate. For example, by respectively controlling rotational speeds and torques of the first motor 11 and the second motor 21, differential speed and torque distribution between vehicle wheels may be realized, allowing for straight traveling of the vehicle.

In an exemplary embodiment, gears of the first planetary gear mechanism 12 are arranged with respect to gears of the second planetary gear mechanism 22 in a positionally symmetrical manner, and such a positionally symmetrical arrangement is a positionally mirror symmetrical arrangement. That is, for each gear of the first planetary gear mechanism 12, there is a gear in the first planetary gear mechanism 12 arranged with respect to the gear of the first planetary gear mechanism 12 in a positionally symmetrical manner. The first motor 11 is connected to one gear of the first planetary gear mechanism 12, the second motor 12 is connected to one gear of the second planetary gear mechanism 22, and the one gear of the first planetary gear mechanism 12 is arranged with respect to the one gear of the second planetary gear mechanism 22 in a positionally dissymmetric manner.

The gears of the first planetary gear mechanism 12 are arranged with respect to the gears of the second planetary gear mechanism 22 in the positionally symmetrical manner, so that forces on the opposite sides of the vehicle are balanced. The first motor 11 is connected to one gear of the first planetary gear mechanism 12, the second motor 21 is connected to one gear of the second planetary gear mechanism 22, and the one gear of the first planetary gear mechanism 12 is arranged with respect to the one gear of the second planetary gear mechanism 22 in a positionally dissymmetric manner. Power is inputted from gears at different positions of the first planetary gear mechanism 12 and the second planetary gear mechanism 22, and has different transmission paths in the first planetary gear mechanism 12 and the second planetary gear mechanism 22. As a result, the order noise when the first planetary gear mechanism 12 and the second planetary gear mechanism 22 operate simultaneously can be further reduced, improving the NVH performance of the vehicle.

In an exemplary embodiment, the first planetary gear mechanism 12 is constructed as a single-row planetary gear mechanism. The first planetary gear mechanism 12 includes a first sun gear 121, a first planetary gear 122, a first inner gear ring 123, a first planetary carrier 124, and a sun gear rotary shaft 120. The first inner gear ring 123 is arranged coaxially with the main shaft of the first motor 11. The first inner gear ring 123 includes a connector 1232 and a gear ring body 1231. The gear ring body 1231 is constructed as a circular ring shape. The connector 1232 is provided at an end of the gear ring body 1231 close to the first motor 11. The connector 1232 is connected to the gear ring body 1231 and the main shaft of the first motor 11. The sun gear rotary shaft 120 is provided in the gear ring body 1231 and arranged coaxially with the first inner gear ring 123. The first sun gear 121 is arranged coaxially with the first inner gear ring 123 in the first inner gear ring 123, and fixedly sleeved over the sun gear rotary shaft 120. The first sun gear 121 is unable to rotate around the sun gear rotary shaft 120. There is an annular gap between the first sun gear 121 and the first inner gear ring 123. The first planetary gear 122 is provided in the annular gap between the first sun gear 121 and the first inner gear ring 123. An axis of the first planetary gear 122 is parallel to an axis of the first sun gear 121.

Each of the first sun gear 121 and the first inner gear ring 123 is engaged with the first planetary gear 122. A plurality of first planetary gears 122 may be provided. For example, three first planetary gears 122 may be provided. The plurality of first planetary gears 122 are evenly distributed in a circumferential direction of the first sun gear 121. The first planetary carrier 124 includes a first support 1241 and a first rotary shaft 1242. The first support 1241 is provided at a side of the first sun gear 121 facing away from the first motor 11. The first rotary shaft 1242 is parallel to the axis of the first sun gear 121 and has an end connected to the first support 1241. The number of first rotary shafts 1242 is the same as the number of first planetary gears 122. The first rotary shafts 1242 are in one-to-one correspondence with the first planetary gears 122. Each of the first planetary gears 122 is sleeved over one of the first rotary shafts 1242 corresponding to the first planetary gear 122 and is rotatable around the first rotary shaft 1242. The first half shaft 13 is provided at a side of the first support 1241 facing away from the first sun gear 121 and is arranged coaxially with the first sun gear 121. An end of the first half shaft 13 is connected to the first support 1241 of the first planetary carrier 124.

The second planetary gear mechanism 22 is constructed as a planetary gear mechanism. The second planetary gear mechanism 22 includes a second sun gear 221, a second planetary gear 222, a second inner gear ring 223, and a second planetary carrier 224. The second inner gear ring 223 is disposed to remain stationary and is unmovable. The second sun gear 221 is arranged coaxially with the second inner gear ring 223 in the second inner gear ring 223. The main shaft of the second motor 21 is arranged coaxially with the second sun gear 221, and the second sun gear 221 is sleeved over the main shaft of the second motor 21. There is an annular gap between the second sun gear 221 and the second inner gear ring 223. The second planetary gear 222 is provided in the annular gap between the second sun gear 221 and the second inner gear ring 223. An axis of the second planetary gear 222 is parallel to an axis of the second sun gear 221. Each of the second sun gear 221 and the second inner gear ring 223 is engaged with the second planetary gear 222. A plurality of second planetary gears 222 may be provided. For example, three second planetary gears 222 may be provided. The plurality of second planetary gears 222 are evenly distributed in a circumferential direction of the second sun gear 221. The second planetary carrier 224 includes a second support 2241 and a second rotary shaft 2242. The second support 2241 is provided at a side of the second sun gear 221 facing away from the second motor 21. The second rotary shaft 2242 is parallel to the axis of the second sun gear 221 and has an end connected to the second support 2241. The number of second rotary shafts 2242 is the same as the number of second planetary gears 222. The second rotary shafts 2242 are in one-to-one correspondence with the second planetary gears 222. Each of the second planetary gears 222 is sleeved over one of the second rotary shafts 2242 corresponding to the second planetary gears 222 and is rotatable around the second rotary shaft 2242. The second half shaft 23 is provided at a side of the second support 2241 facing away from the second sun gear 221 and is arranged coaxially with the second sun gear 221. An end of the second half shaft 23 is connected to the second support 2241 of the second planetary carrier 224.

In this embodiment, the first planetary gear mechanism 12 and the second planetary gear mechanism 22 are both a single-row planetary gear mechanism, and thus is compact in structure and high in reliability as the speed reducer.

The first sun gear 121 is arranged symmetrically with respect to the second sun gear 221. The first planetary gear 122 is arranged symmetrically with respect to the second planetary gear 222. The first inner gear ring 123 is arranged symmetrically with respect to the second inner gear ring 223. The first planetary carrier 124 is arranged symmetrically with respect to the second planetary carrier 224.

The gears of the first planetary gear mechanism 12 are arranged with respect to the gears of the second planetary gear mechanism 22 in the positionally symmetrical manner, so that forces on the opposite sides of the vehicle are balanced. The first motor 11 is connected to the first inner gear ring 123 of the first planetary gear mechanism 12, and the second motor 21 is connected to the second sun gear of the second planetary gear mechanism 22. The power is inputted from the first inner gear ring 123 of the first planetary gear mechanism 12 to the first planetary gear mechanism 12 and inputted from the second sun gear of the second planetary gear mechanism 22 to the second planetary gear mechanism 22, respectively. In this way, the order noise when the first planetary gear mechanism 12 and the second planetary gear mechanism 22 operate simultaneously is reduced, improving the NVH performance of the vehicle.

Second Embodiment

Figure 2:
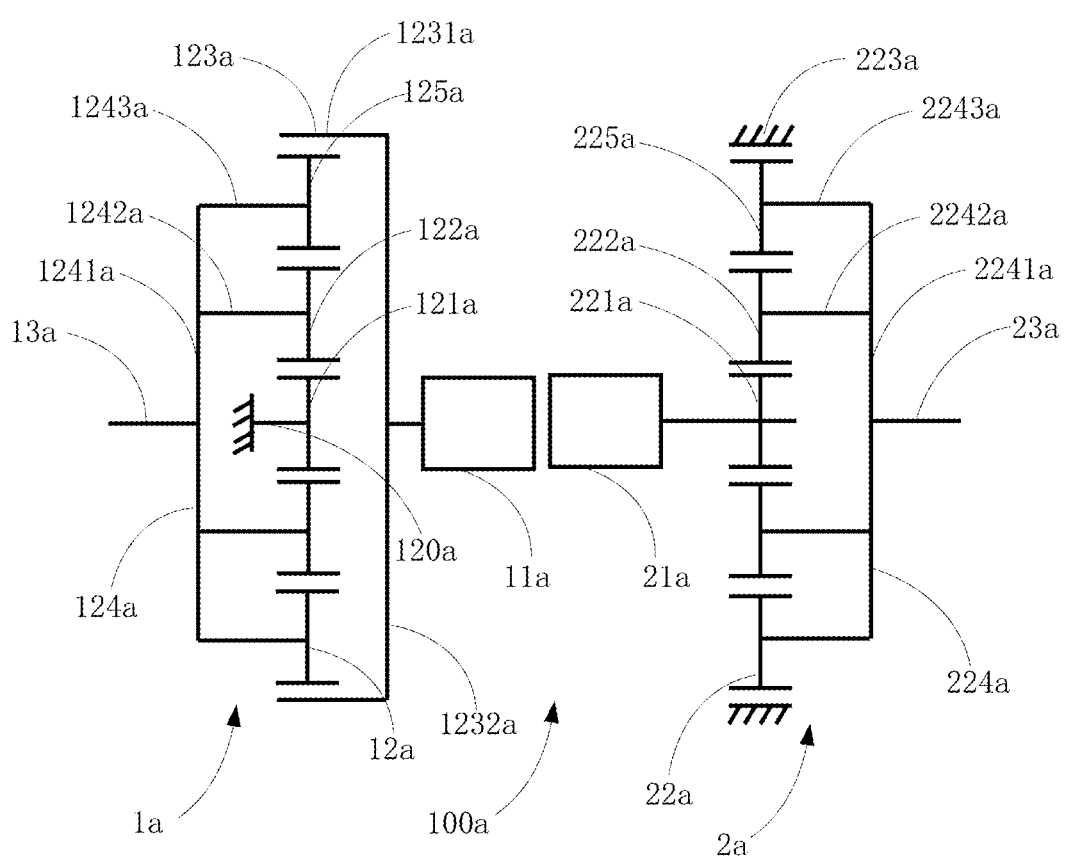
FIG. 2 is a schematic view of a double-motor electric drive assembly according to a second embodiment of the present disclosure.

As illustrated in FIG. 2, FIG. 2 illustrates a structure of a double-motor electric drive assembly 100a according to the second embodiment. The double-motor electric drive assembly 100a is mounted on a vehicle and provides the vehicle with driving power. The vehicle may be a pure electric vehicle.

The double-motor electric drive assembly 100a includes a first drive mechanism 1a and a second drive mechanism 2a. The first drive mechanism 1a and the second drive mechanism 2a may be provided at one drive axle. The first drive mechanism 1a includes a first motor 11a, a first planetary gear mechanism 12a, and a first half shaft 13a. The first planetary gear mechanism 12a is provided between the first half shaft 13a and the first motor 11a. A main shaft of the first motor 11a is connected to the first planetary gear mechanism 12a, and the first planetary gear mechanism 12a is connected to the first half shaft 13a. The first planetary gear mechanism 12a may be a speed reducer. After reducing a speed of a torque outputted by the first motor 11a and increasing the outputted torque, the first planetary gear mechanism 12a may transmit the torque to the first half shaft 13a to drive the first half shaft 13a to rotate.

The second drive mechanism 2a includes a second motor 21a, a second planetary gear mechanism 22a, and a second half shaft 23a. The second planetary gear mechanism 22a is provided between the second half shaft 23a and the second motor 21a. A main shaft of the second motor 21a is connected to the second planetary gear mechanism 22a, and the second planetary gear mechanism 22a is connected to the second half shaft 23a. The second planetary gear mechanism 22a may be a speed reducer. After reducing a speed of a torque outputted by the second motor 21a and increasing the outputted torque, the second planetary gear mechanism 22a may transmit the torque to the second half shaft 23a to drive the second half shaft 23a to rotate. The first motor 11a and the second motor 21a are provided between the first planetary gear mechanism 12a and the second planetary gear mechanism 22a. The first half shaft 13a is provided at a side of the first planetary gear mechanism 12a facing away from the second planetary gear mechanism 22a, and the second half shaft 23a is provided at a side of the second planetary gear mechanism 22a facing away from the first planetary gear mechanism 12a. The first half shaft 13a, the second half shaft 23a, the main shaft of the first motor 11a, and the main shaft of the second motor 21a are arranged coaxially.

In this embodiment, the first planetary gear mechanism 12a is constructed as a longitudinal double-row planetary gear mechanism. The first planetary gear mechanism 12a includes a first sun gear 121a, a first planetary gear 122a, a second planetary gear 125a, a first inner gear ring 123a, a first planetary carrier 124a, and a sun gear rotary shaft 120a. The first inner gear ring 123a is arranged coaxially with the main shaft of the first motor 11a. The first inner gear ring 123a includes a connector 1232a and a gear ring body 1231a. The connector 1232a is provided at an end of the gear ring body 1231a close to the first motor 11a. The connector 1232a is connected to the gear ring body 1231a and the main shaft of the first motor 11a. The sun gear rotary shaft 120a is provided in and arranged coaxially with the first inner gear ring 123a. The first sun gear 121a is arranged coaxially with the first inner gear ring 123a in the first inner gear ring 123a, and fixedly sleeved over the sun gear rotary shaft 120a. The first sun gear 121a is unable to rotate around the sun gear rotary shaft 120a. There is an annular gap between the first sun gear 121a and the first inner gear ring 123a. Each of the first planetary gear 122a and the second planetary gear 125a is provided in the annular gap between the first sun gear 121a and the first inner gear ring 123a. Axes of the first planetary gear 122a and the second planetary gear 125a are both parallel to an axis of the first sun gear 121a. A plurality of first planetary gears 122a may be provided. For example, three first planetary gears 122a may be provided. The plurality of first planetary gears 122 are evenly distributed in a circumferential direction of the first sun gear 121a. The plurality of first planetary gears 122a are engaged with the first sun gear 121a. The number of second planetary gears 125a is the same as the number of first planetary gears 122a. The first planetary gears 122a are in one-to-one correspondence with the second planetary gears 125a. Each of the second planetary gears 125a is engaged with one of the first planetary gears 122a corresponding to the second planetary gear 125a and is engaged with the first inner gear ring 123a.

The first planetary carrier 124a includes a first support 1241a, a first rotary shaft 1242a, and a second rotary shaft 1243a. The first support 1241a is provided at a side of the first sun gear 121a facing away from the first motor 11a. Each of the first rotary shaft 1242a and the second rotary shaft 1243a is parallel to the axis of the first sun gear 121a, and each of an end of the first rotary shaft 1242a and an end of the second rotary shaft 1243a is connected to the first support 1241a. The number of first rotary shafts 1242a is the same as the number of first planetary gears 122a. The first rotary shafts 1242a are in one-to-one correspondence with the first planetary gears 122a. Each of the first planetary gears 122a is sleeved over one of the first rotary shafts 1242a corresponding to the first planetary gear 122 and is rotatable around the first rotary shaft 1242a. The number of second rotary shafts 1243a is the same as the number of second planetary gears 125a. The second rotary shafts 1243a are in one-to-one correspondence with the second planetary gears 125. Each of the second planetary gears 125a is sleeved over one of the second rotary shafts 1243a corresponding to the second planetary gear 222 and is rotatable around the second rotary shaft 1243a. The first half shaft 13a is provided at a side of the first support 1241a facing away from the first sun gear 121a and arranged coaxially with the first sun gear 121a. An end of the first half shaft 13a is connected to the first support 1241a of the first planetary carrier 124a.

A torque outputted by the main shaft of the first motor 11a passes through the first sun gear 121a, the first planetary gear 122a, the second planetary gear 125a, the first inner gear ring 123a, and the first planetary carrier 124a sequentially, and is transmitted to the first half shaft 13a to drive the first half shaft 13a to rotate.

In this embodiment, the second planetary gear mechanism 22a is constructed as a longitudinal double-row planetary gear mechanism. The second planetary gear mechanism 22a includes a second sun gear 221a, a third planetary gear 222a, a fourth planetary gear 225a, a second inner gear ring 223a, and a second planetary carrier 224a. The second inner gear ring 223a is disposed to remain stationary and is unmovable. The second sun gear 221a is provided in the second inner gear ring 223a and arranged coaxially with the second inner gear ring 223a. The main shaft of the second motor 21a is arranged coaxially with the second sun gear 221a, and the second sun gear 221a is sleeved over the main shaft of the second motor 21a. There is an annular gap between the second sun gear 221a and the second inner gear ring 223a. Each of the third planetary gear 222a and the fourth planetary gear 225a is provided in the annular gap between the second sun gear 221a and the second inner gear ring 223a. Axes of the third planetary gear 222a and the fourth planetary gear 225a are both parallel to an axis of the second sun gear 221a. A plurality of third planetary gears 222a may be provided. For example, three third planetary gears 222a may be provided. The plurality of third planetary gears 122 are evenly distributed in a circumferential direction of the second sun gear 221a. The plurality of third planetary gears 222a are engaged with the second sun gear 221a. The number of fourth planetary gears 225a is the same as the number of third planetary gears 222a. The third planetary gears 222a are in one-to-one correspondence with the fourth planetary gears 225a. Each of the third planetary gears 222a is engaged with one of the fourth planetary gears 225a corresponding to the third planetary gear 125a, and is engaged with the second inner gear ring 223a.

The second planetary carrier 224a includes a second support 2241a, a third rotary shaft 2242a, and a fourth rotary shaft 2243a. The second support 2241a is provided at a side of the second sun gear 221a facing away from the second motor 21a. Each of the third rotary shaft 2242a and the fourth rotary shaft 2243a is parallel to the axis of the second sun gear 221a. Each of an end of the third rotary shaft 2242a and an end of the fourth rotary shaft 2243a is connected to the first support 1241a. The number of third rotary shafts 2242a is the same as the number of third planetary gears 222a. The third rotary shafts 2242a are in one-to-one correspondence with the third planetary gears 222a. Each of the third planetary gears 222a is sleeved over one of the third rotary shafts 2242a corresponding to the third planetary gear 222 and is rotatable around the third rotary shaft 2242a. The number of fourth rotary shafts 2243a is the same as the number of fourth planetary gears 225a. The fourth rotary shafts 2243a are in one-to-one correspondence with the fourth planetary gears 225a. Each of the fourth planetary gears 225a is sleeved over one of the fourth rotary shafts 2243a corresponding to the fourth planetary gear 222 and is rotatable around the fourth rotary shaft 2243a. The second half shaft 23a is provided at a side of the second support 2241a facing away from the second sun gear 221a and arranged coaxially with the second sun gear 221a. An end of the second half shaft 23a is connected to the second support 2241a of the second planetary carrier 224a.

A torque outputted by the main shaft of the second motor 21a passes through the second sun gear 221a, the third planetary gear 222a, the fourth planetary gear 225a, the second inner gear ring 223a, and the second planetary carrier 224a sequentially, and is transmitted to the second half shaft 23a to drive the second half shaft 23a to rotate.

In this embodiment, each of the first planetary gear mechanism 12a and the second planetary gear mechanism 22a is the longitudinal double-row planetary gear mechanism. A transmission ratio of the first planetary gear mechanism 12a and a transmission ratio of the second planetary gear mechanism 22a are greater than that of a single-row planetary gear mechanism.

The first sun gear 121a is arranged symmetrically with respect to the second sun gear 221a. The first planetary gear 122a is arranged symmetrically with respect to the third planetary gear 222a. The second planetary gear 125a is arranged symmetrically with respect to the fourth planetary gear 225a. The first inner gear ring 123a is arranged symmetrically with respect to the second inner gear ring 223a, and the first planetary carrier 124a is arranged symmetrically with respect to the second planetary carrier 224a.

Gears of the first planetary gear mechanism 12a are arranged with respect to gears of the second planetary gear mechanism 22a in a positionally symmetrical manner, so that forces on the opposite sides of the vehicle are balanced. The first motor 11a is connected to the first inner gear ring 123a of the first planetary gear mechanism 12a, and the second motor 21a is connected to the second sun gear 221a of the second planetary gear mechanism 22a. Power is inputted from the first inner gear ring 123a to the first planetary gear mechanism 12a and inputted from the second sun gear 221a to the second planetary gear mechanism 22a. In this way, an order separation of first planetary gear mechanism 12a and the second planetary gear mechanism 22a can be realized, thereby avoiding an order overlap of the first planetary gear mechanism 12a and the second planetary gear mechanism 22a. As a result, order noise when the first planetary gear mechanism 12a and the second planetary gear mechanism 22a operate simultaneously can be significantly reduced, improving NVH performance of the vehicle and obtaining a better driving experience. Meanwhile, the first motor 11a and the second motor 21a may each be a motor with low power. When the first motor 11a and the second motor 21a operate simultaneously, the double-motor electric drive assembly 100a may output larger power to satisfy high-power output requirements of the vehicle. Since the first motor 11a and the second motor 21a may be controlled separately, power output at a side or two sides of the vehicle may be changed as power requirements, to realize functions of vehicle differential speed, differential lock, vector control, and the like, making control more accurate. For example, by respectively controlling rotational speeds and torques of the first motor 11a and the second motor 21a, differential speed and torque distribution between vehicle wheels may be realized, allowing for straight traveling of the vehicle.

In an exemplary embodiment, the first half shaft 13, the first planetary gear mechanism 12, the first motor 11, the second motor 21, the second planetary gear mechanism 22, and the second half shaft 23 are coaxially arranged sequentially.

With this arrangement, the double-motor electric drive assembly may extend along the drive axle, and has a small radial size, a compact structure, and a small occupied space.

Third Embodiment

Figure 3:
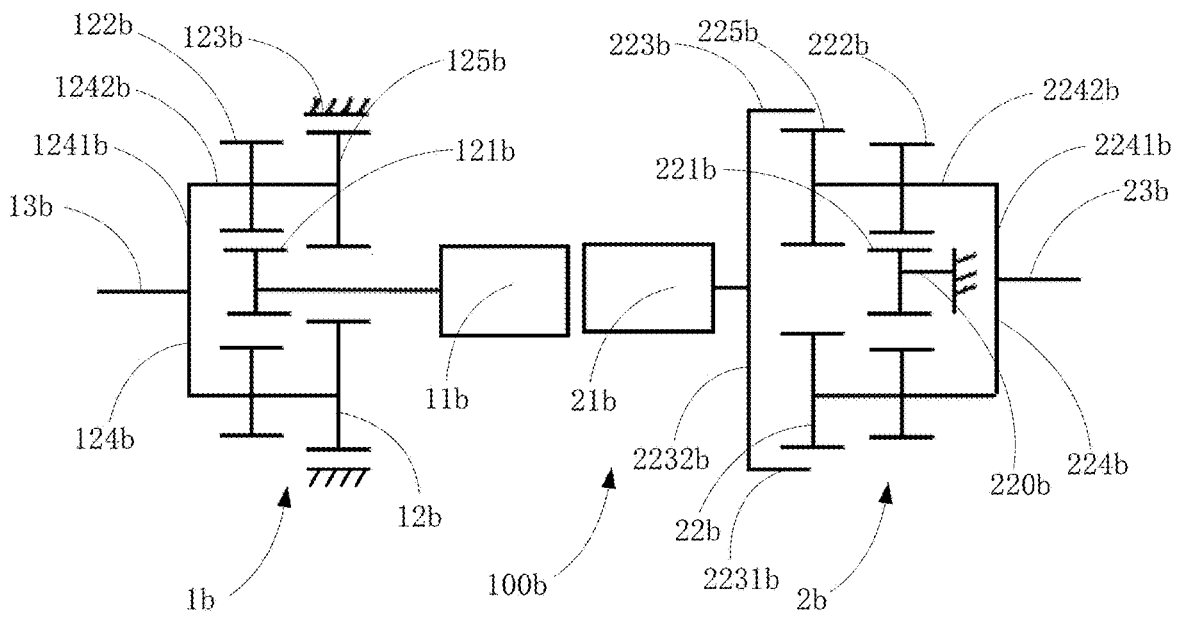
FIG. 3 is a schematic view of a double-motor electric drive assembly according to a third embodiment of the present disclosure.

As illustrated in FIG. 3, FIG. 3 illustrates a structure of a double-motor electric drive assembly 100b according to the third embodiment. The double-motor electric drive assembly 100b is mounted on a vehicle and provides the vehicle with driving power. The vehicle may be a pure electric vehicle.

The double-motor electric drive assembly 100b includes a first drive mechanism 1b and a second drive mechanism 2b. The first drive mechanism 1b and the second drive mechanism 2b may be provided at one drive axle. The first drive mechanism 1b includes a first motor 11b, a first planetary gear mechanism 12b, and a first half shaft 13b. The first planetary gear mechanism 12b is provided between the first half shaft 13b and the first motor 11b. A main shaft of the first motor 11b is connected to the first planetary gear mechanism 12b, and the first planetary gear mechanism 12b is connected to the first half shaft 13b. The first planetary gear mechanism 12b may be a speed reducer. After reducing a speed of a torque outputted by the first motor 11b and increasing the outputted torque, the first planetary gear mechanism 12b may transmit the torque to the first half shaft 13b to drive the first half shaft 13b to rotate.

The second drive mechanism 2b includes a second motor 21b, a second planetary gear mechanism 22b, and a second half shaft 23b. The second planetary gear mechanism 22b is provided between the second half shaft 23b and the second motor 21b. A main shaft of the second motor 21b is connected to the second planetary gear mechanism 22b, and the second planetary gear mechanism 22b is connected to the second half shaft 23b. The second planetary gear mechanism 22b may be a speed reducer. After reducing a speed of a torque outputted by the second motor 21b and increasing the outputted torque, the second planetary gear mechanism 22b may transmit the torque to the second half shaft 23b to drive the second half shaft 23b to rotate. The first motor 11b and the second motor 21b are provided between the first planetary gear mechanism 12b and the second planetary gear mechanism 22b. The first half shaft 13b is provided at a side of the first planetary gear mechanism 12b facing away from the second planetary gear mechanism 22b, and the second half shaft 23b is provided at a side of the second planetary gear mechanism 22b facing away from the first planetary gear mechanism 12b. The first half shaft 13b, the second half shaft 23b, the main shaft of the first motor 11b, and the main shaft of the second motor 21b are arranged coaxially.

In this embodiment, the first planetary gear mechanism 12b is constructed as a transverse double-row planetary gear mechanism. The first planetary gear mechanism 12b includes a first sun gear 121b, a first planetary gear 122b, a second planetary gear 125b, a first inner gear ring 123b, and a first planetary carrier 124b. The first inner gear ring 123b is disposed to remain stationary and is unmovable. The first sun gear 121b is provided at a side of the first inner gear ring 123b facing away from the first motor 11b, and is arranged coaxially with the first inner gear ring 123b. Further, the first sun gear 121b has an outer diameter smaller than an inner diameter of the first inner gear ring 123b. The main shaft of the first motor 11b is arranged coaxially with the first sun gear 121*b*, and the first sun gear 121*b* is sleeved over the main shaft of the first motor 11*b*.

Axes of the first planetary gear 122*b* and the second planetary gear 125*b* are both parallel to an axis of the first sun gear 121*b*. A plurality of first planetary gears 122*b* may be provided. For example, three first planetary gears 122*b* may be provided. The plurality of first planetary gears 122 are evenly distributed in a circumferential direction of the first sun gear 121*b*. The plurality of first planetary gears 122*b* are engaged with the first sun gear 121*b*. The number of second planetary gears 125*b* is the same as the number of first planetary gears 122*b*. The second planetary gear 125*b* is provided in the first inner gear ring 123*b*. The first planetary gears 122*b* are in one-to-one correspondence with the second planetary gears 125*b*. Each of the second planetary gears 125*b* is arranged coaxially with one of the first planetary gears 122*b* corresponding to the second planetary gear 125*b*, and is engaged with the first inner gear ring 123*b*. The first planetary gear 122*b* has a greater outer diameter than the second planetary gear 125*b*.

The first planetary carrier 124*b* includes a first support 1241*b* and a first rotary shaft 1242*b*. The first support 1241*b* is provided at a side of the first planetary gear 122*b* facing away from the second planetary gear 125*b*. The first rotary shaft 1242*b* is parallel to the axis of the first sun gear 121*b* and has an end connected to the first support 1241*b*. The number of first rotary shafts 1242*b* is the same as the number of first planetary gears 122*b*. The first rotary shafts 1242*b* are in one-to-one correspondence with the first planetary gears 122*b*. The first rotary shafts 1242*b* are in one-to-one correspondence with the second planetary gears 125*b*. Each of the first planetary gears 122*b* is sleeved over one of the first rotary shafts 1242*b* corresponding to the first planetary gear 122*b* and is rotatable around the first rotary shaft 1242*b*. Each of the second planetary gears 125*b* is sleeved over one of the first rotary shafts 1242*b* corresponding to the second planetary gear 125*b* and is rotatable around the first rotary shaft 1242*b*. The first half shaft 13*b* is provided at a side of the first support 1241*b* facing away from the first sun gear 121*b* and is arranged coaxially with the first sun gear 121*b*. An end of the first half shaft 13*b* is connected to the first support 1241*b* of the first planetary carrier 124*b*.

A torque outputted by the main shaft of the first motor 11*b* is transmitted to the first half shaft 13*b* by the first planetary gear mechanism 12*b* to drive the first half shaft 13*b* to rotate.

In this embodiment, the second planetary gear mechanism 22*b* is constructed as a transverse double-row planetary gear mechanism. The second planetary gear mechanism 22*b* includes a second sun gear 221*b*, a third planetary gear 222*b*, a fourth planetary gear 225*b*, a second inner gear ring 223*b*, a second planetary carrier 224*b*, and a sun gear rotary shaft 220*b*. The second inner gear ring 223*b* is arranged coaxially with the main shaft of the second motor 21*b*. The second inner gear ring 223*b* includes a connector 2232*b* and a gear ring body 2231*b*. The connector 2232*b* is provided at an end of the gear ring body 2231*b*. The connector 2232*b* is connected to the gear ring body 2231*b* and the main shaft of the second motor 21*b*, respectively. The connector 2232*b* may be provided at an end of the gear ring body 2231*b*. The sun gear rotary shaft 220*b* is provided at a side of the second inner gear ring 223*b* facing away from the second motor 21*b* and is coaxially arranged with the second inner gear ring 223*b*. The sun gear rotary shaft 220*b* is disposed to remain stationary. The second sun gear 221*b* is fixedly sleeved over the sun gear rotary shaft 220*b* and is unable to rotate around the sun gear rotary shaft 220*b*. In this way, the second sun gear 221*b* is provided at the side of the second inner gear ring 223*b* facing away from the second motor 21*b*, and coaxially arranged with the second inner gear ring 223*b*. Further, the second sun gear 221*b* has an outer diameter smaller than an inner diameter of the second inner gear ring 223*b*.

Axes of the third planetary gear 222*b* and the fourth planetary gear 225*b* are both parallel to the axis of the second sun gear 221*b*. A plurality of third planetary gears 222*b* may be provided. For example, three third planetary gears 222*b* may be provided. The plurality of third planetary gears 122 are evenly distributed in a circumferential direction of the second sun gear 221*b*. Each of the plurality of third planetary gears 222*b* is engaged with the second sun gear 221*b*. The fourth planetary gear 225*b* is provided at an inner side of the second inner gear ring 223*b*. The number of fourth planetary gears 225*b* is the same as the number of third planetary gears 222*b*. The third planetary gears 222*b* are in one-to-one correspondence with the fourth planetary gears 225*b*. Each of the fourth planetary gears 225*b* is provided in the second inner gear ring 223*b*. Each of the fourth planetary gears 225*b* is arranged coaxially with one of the third planetary gears 222*b* corresponding to the fourth planetary gear 225*b*, and is engaged with the second inner gear ring 223*b*. The third planetary gear 222*b* has a greater outer diameter than the fourth planetary gear 225*b*.

The second planetary carrier 224*b* includes a second support 2241*b* and a second rotary shaft 2242*b*. The second support 2241*b* is provided at a side of the third planetary gear 222*b* facing away from the fourth planetary gear 225*b*. The second rotary shaft 2242*b* is parallel to the axis of the second sun gear 221*b* and has an end connected to the second support 2241*b*. The number of second rotary shafts 2242*b* is the same as the number of third planetary gears 222*b*. The second rotary shafts 2242*b* are in one-to-one correspondence with the third planetary gears 222*b*. The second rotary shafts 2242*b* are in one-to-one correspondence with the fourth planetary gears 225*b*. Each of the third planetary gears 222*b* is sleeved over one of the second rotary shafts 2242*b* corresponding to the third planetary gear 222*b* and is rotatable around the second rotary shaft 2242*b*. Each of the fourth planetary gears 225*b* is sleeved over one of the second rotary shafts 2242*b* corresponding to the fourth planetary gear 225*b* and is rotatable around the second rotary shaft 2242*b*. The second half shaft 23*b* is provided at a side of the second support 2241*b* facing away from the second sun gear 221*b* and is arranged coaxially with the second sun gear 221*b*. An end of the second half shaft 23*b* is connected to the second support 2241*b* of the second planetary carrier 224*b*.

A torque outputted by the main shaft of the second motor 21*b* is transmitted to the second half shaft 23*b* by the second planetary gear mechanism 22*b* to drive the second half shaft 23*b* to rotate.

Since both the first planetary gear mechanism 12*b* and the second planetary gear mechanism 22*b* are the transverse double-row planetary gear mechanisms, transmission ratios of both the first planetary gear mechanism 12*b* and the second planetary gear mechanism 22*b* are greater than a transmission ratio of a single-row planetary gear mechanism. Meanwhile, the transverse double-row planetary gear mechanism has a smaller radial size than a longitudinal double-row planetary gear mechanism.

The first sun gear 121*b* is arranged symmetrically with respect to the second sun gear 221*b*. The first planetary gear 122*b* is arranged symmetrically with respect to the third planetary gear 222*b*. The second planetary gear 125*b* is arranged symmetrically with respect to the fourth planetary gear 225*b*. The first inner gear ring 123*b* is arranged symmetrically with respect to the second inner gear ring 223*b*, and the first planetary carrier 124*a* is arranged symmetrically with respect to the second planetary carrier 224*b*.

Gears of the first planetary gear mechanism 12*b* are arranged with respect to gears of the second planetary gear mechanism 22*b* in a positionally symmetrical manner, so that forces on the opposite sides of the vehicle are balanced. The first motor 11*b* is connected to the first sun gear 121*b* of the first planetary gear mechanism 12*b*, and the second motor 21*b* is connected to the second inner gear ring 223*b* of the second planetary gear mechanism 22*b*. Power is inputted from the first sun gear 121*b* to the first planetary gear mechanism 12*b* and inputted from the second inner gear ring 223*b* to the second planetary gear mechanism 22*b*. In this way, an order separation of the first planetary gear mechanism 12*b* and the second planetary gear mechanism 22*b* can be realized, thereby avoiding an order overlap of the first planetary gear mechanism 12*b* and the second planetary gear mechanism 22*b*. As a result, order noise when the first planetary gear mechanism 12*b* and the second planetary gear mechanism 22*b* operate simultaneously can be significantly reduced, improving NVH performance of the vehicle and obtaining a better driving experience. Meanwhile, the first motor 11*b* and the second motor 21*b* may each be a motor with low power. When the first motor 11*b* and the second motor 21*b* operate simultaneously, the double-motor electric drive assembly 100*b* may output larger power to satisfy high-power output requirements of the vehicle. Since the first motor 11*b* and the second motor 21*b* may be controlled separately, power output at a side or two sides of the vehicle may be changed as power requirements, to realize functions of vehicle differential speed, differential lock, vector control, and the like, making control more accurate. For example, by respectively controlling rotational speeds and torques of the first motor 11*b* and the second motor 21*b*, differential speed and torque distribution between vehicle wheels may be realized, allowing for straight traveling of the vehicle.

Fourth Embodiment

Figure 4:
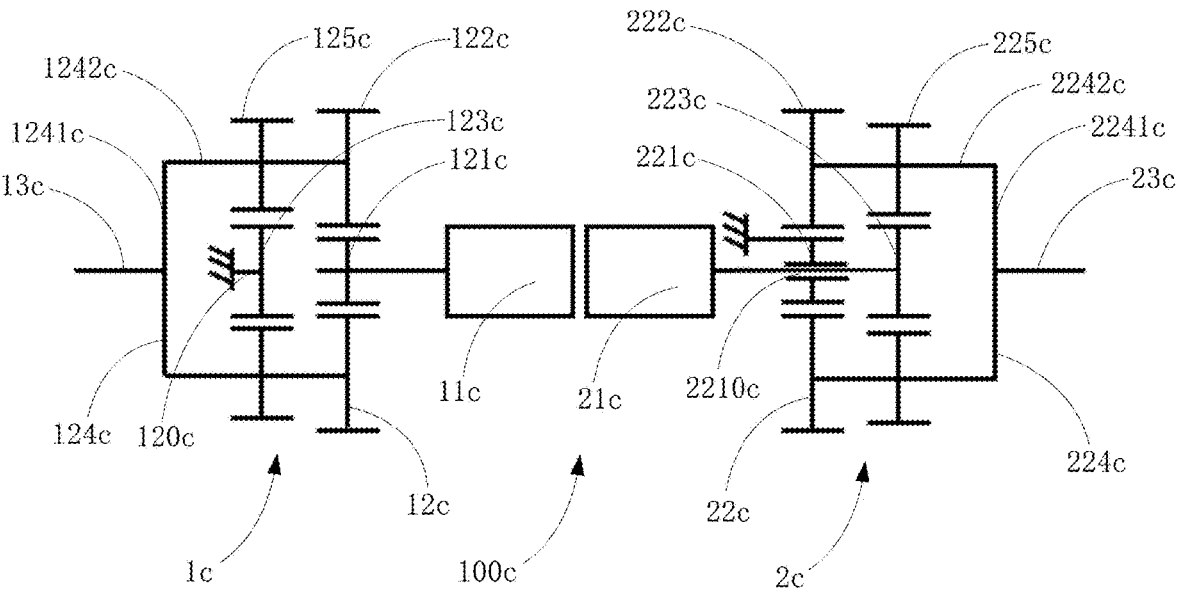
FIG. 4 is a schematic view of a double-motor electric drive assembly according to a fourth embodiment of the present disclosure.

As illustrated in FIG. 4, FIG. 4 illustrates a structure of a double-motor electric drive assembly 100*c* according to the fourth embodiment. The double-motor electric drive assembly 100*c* is mounted on a vehicle and provides the vehicle with driving power. The vehicle may be a pure electric vehicle.

The double-motor electric drive assembly 100*c* includes a first drive mechanism 1*c* and a second drive mechanism 2*c*. The first drive mechanism 1*c* and the second drive mechanism 2*c* may be provided at one drive axle. The first drive mechanism 1*c* includes a first motor 11*c*, a first planetary gear mechanism 12*c*, and a first half shaft 13*c*. The first planetary gear mechanism 12*c* is provided between the first half shaft 13*c* and the first motor 11*c*. A main shaft of the first motor 11*c* is connected to the first planetary gear mechanism 12*c*, and the first planetary gear mechanism 12*c* is connected to the first half shaft 13*c*. The first planetary gear mechanism 12*c* may be a speed reducer. After reducing a speed of a torque outputted by the first motor 11*c* and increasing the outputted torque, the first planetary gear mechanism 12*c* may transmit the torque to the first half shaft 13*c* to drive the first half shaft 13*c* to rotate.

The second drive mechanism 2*c* includes a second motor 21*c*, a second planetary gear mechanism 22*c*, and a second half shaft 23*c*. The second planetary gear mechanism 22*c* is provided between the second half shaft 23*c* and the second motor 21*c*. A main shaft of the second motor 21*c* is connected to the second planetary gear mechanism 22*c*, and the second planetary gear mechanism 22*c* is connected to the second half shaft 23*c*. The second planetary gear mechanism 22*c* may be a speed reducer. After reducing a speed of a torque outputted by the second motor 21*c* and increasing the outputted torque, the second planetary gear mechanism 22*c* may transmit the torque to the second half shaft 23*c* to drive the second half shaft 23*c* to rotate. The first motor 11*c* and the second motor 21*c* are provided between the first planetary gear mechanism 12*c* and the second planetary gear mechanism 22*c*. The first half shaft 13*c* is provided at a side of the first planetary gear mechanism 12*c* facing away from the second planetary gear mechanism 22*c*, and the second half shaft 23*c* is provided at a side of the second planetary gear mechanism 22*c* facing away from the first planetary gear mechanism 12*c*. The first half shaft 13*c*, the second half shaft 23*c*, the main shaft of the first motor 11*c*, and the main shaft of the second motor 21*c* are arranged coaxially.

In this embodiment, the first planetary gear mechanism 12*c* is constructed as a transverse double-row planetary gear mechanism. The first planetary gear mechanism 12*c* includes a first sun gear 121*c*, a second sun gear 123*c*, a first planetary gear 122*c*, a second planetary gear 125*c*, a first planetary carrier 124*c*, and a sun gear rotary shaft 120*c*. The first sun gear 121*c* is sleeved over the main shaft of the first motor 11*c*. The second sun gear 123*c* is provided at a side of the first sun gear 121*c* facing away from the first motor 11*c*. The second sun gear 123*c* is arranged coaxially with the first sun gear 121*c*. The sun gear rotary shaft 120*c* is provided at the side of the first sun gear 121*c* facing away from the first motor 11*c* and is arranged coaxially with the first sun gear 121*c*. The second sun gear 123*c* is fixedly sleeved over the sun gear rotary shaft 120*c*. The second sun gear 123*c* is unable to rotate around the sun gear rotary shaft 120*c*. The second sun gear 123*c* may have a greater outer diameter than the first sun gear 121*c*.

Axes of the first planetary gear 122*c* and the second planetary gear 125*c* are both parallel to an axis of the first sun gear 121*c*. A plurality of first planetary gears 122*c* may be provided. For example, three first planetary gears 122*c* may be provided. The plurality of first planetary gears 122 are evenly distributed in a circumferential direction of the first sun gear 121*c*. The plurality of first planetary gears 122*c* are engaged with the first sun gear 121*c*. The number of second planetary gears 125*c* is the same as the number of first planetary gears 122*c*. The plurality of second planetary gears 125*c* are evenly distributed in a circumferential direction of the second sun gear 123*c*. The first planetary gears 122*c* are in one-to-one correspondence with the second planetary gears 125*c*. Each of the second planetary gears 125*c* is arranged coaxially with one of the first planetary gears 122*c* corresponding to the second planetary gear 125*c*, and is engaged with the second sun gear 123*c*. The first planetary gear 122*c* has a greater outer diameter than the second planetary gear 125*c*.

The first planetary carrier 124*c* includes a first support 1241*c* and a first rotary shaft 1242*c*. The first support 1241*c* is provided at a side of the second planetary gear 125*c* facing away from the first planetary gear 122*c*. The first rotary shaft 1242*c* is parallel to the axis of the first sun gear 121*c* and has an end connected to the first support 1241*c*. The number of first rotary shafts 1242*c* is the same as the number of first planetary gears 122*c*. The first rotary shafts 1242*c* are in one-to-one correspondence with the first planetary gears 122*c*. The first rotary shafts 1242*c* are in one-to-one correspondence with the second planetary gears 125*c*. Each of the first planetary gears 122*c* is sleeved over one the first rotary shafts 1242*c* corresponding to the first planetary gears 122*b* and is rotatable around the first rotary shaft 1242*c*. Each of the second planetary gears 125*c* is sleeved over one of the first rotary shafts 1242*c* corresponding to the second planetary gear 125*b* and is rotatable around the first rotary shaft 1242*c*. The first half shaft 13*c* is provided at a side of the first support 1241*c* facing away from the second sun gear 123*c* and is arranged coaxially with the second sun gear 123*c*. An end of the first half shaft 13*c* is connected to the first support 1241*c* of the first planetary carrier 124*c*.

A torque outputted by the main shaft of the first motor 11*c* is transmitted to the first half shaft 13*c* by the first planetary gear mechanism 12*c* to drive the first half shaft 13*c* to rotate.

In this embodiment, the second planetary gear mechanism 22*c* is constructed as a transverse double-row planetary gear mechanism. The second planetary gear mechanism 22*c* includes a third sun gear 221*c*, a fourth sun gear 223*c*, a third planetary gear 222*c*, a fourth planetary gear 225*c*, and a second planetary carrier 224*c*. The third sun gear 221*c* is disposed to remain stationary. The third sun gear 221*c* has a through hole 2210*c* extending through the third sun gear 221*c* in an axial direction of the third sun gear 221*c*. The through hole 2210*c* is formed at a middle part of the third sun gear 221*c*. The main shaft of the second motor 21*c* is arranged coaxially with the third sun gear 221*c*, and passes through the through hole 2210*c* of the third sun gear 221*c*. The third sun gear 221*c* is in a clearance fit with the main shaft of the second motor 21*c*. The fourth sun gear 223*c* is provided at a side of the third sun gear 221*c* facing away from the second motor 21*c*. The fourth sun gear 223*c* is arranged coaxially with the third sun gear 221*c*. The fourth sun gear 223*c* is sleeved over the main shaft of the second motor 21*c* and is fixedly connected to the main shaft of the second motor 21*c*. The fourth sun gear 223*c* may have a greater outer diameter than the third sun gear 221*c*.

Axes of the third planetary gear 222*c* and the fourth planetary gear 225*c* are both parallel to an axis of the third sun gear 221*c*. A plurality of third planetary gears 222*c* may be provided. For example, three third planetary gears 222*c* may be provided. The plurality of third planetary gears 122 are evenly distributed in a circumferential direction of the third sun gear 221*c*. Each of the plurality of third planetary gears 222*c* is engaged with the third sun gear 221*c*. The number of fourth planetary gears 225*c* is the same as the number of third planetary gears 222*c*. The plurality of fourth planetary gears 225*c* are evenly distributed in a circumferential direction of the fourth sun gear 223*c*. The third planetary gears 222*c* are in one-to-one correspondence with the fourth planetary gears 225*c*. Each of the fourth planetary gear 225*c* is arranged coaxially with one of the third planetary gears 222*c* corresponding to the fourth planetary gear 225*c*, and is engaged with the fourth sun gear 223*c*. The third planetary gear 222*c* has a greater outer diameter than the fourth planetary gear 225*c*.

The second planetary carrier 224*c* includes a second support 2241*c* and a second rotary shaft 2242*c*. The second support 2241*c* is provided at a side of the fourth planetary gear 225*c* facing away from the third planetary gear 222*c*. The second rotary shaft 2242*c* is parallel to the axis of the third sun gear 221*c* and has an end connected to the second support 2241*c*. The number of second rotary shafts 2242*c* is the same as the number of third planetary gears 222*c*. The second rotary shafts 2242*c* are in one-to-one correspondence with the third planetary gears 222*c*. The second rotary shafts 2242*c* are in one-to-one correspondence with the fourth planetary gears 225*c*. Each of the third planetary gears 222*c* is sleeved over one of the second rotary shafts 2242*c* corresponding to the third planetary gear 222*c* and is rotatable around the second rotary shaft 2242*c*. Each of the fourth planetary gears 225*c* is sleeved over one of the second rotary shafts 2242*c* corresponding to the fourth planetary gear 225*c* and is rotatable around the second rotary shaft 2242*c*. The second half shaft 23*c* is provided at a side of the second support 2241*c* facing away from the second sun gear 123*c*, and the second half shaft 23*c* is arranged coaxially with the third sun gear 221*c*. An end of the second half shaft 23*c* is connected to the second support 2241*c* of the second planetary carrier 224*c*.

A torque outputted by the main shaft of the second motor 21*c* is transmitted to the second half shaft 23*c* by the second planetary gear mechanism 22*c* to drive the second half shaft 23*c* to rotate.

Since each of the first planetary gear mechanism 12*c* and the second planetary gear mechanism 22*c* is the transverse double-row planetary gear mechanism, transmission ratios of both the first planetary gear mechanism 12*c* and the second planetary gear mechanism 22*c* are greater than a transmission ratio of a single-row planetary gear mechanism. Moreover, the first planetary gear mechanism 12*c* and the second planetary gear mechanism 22*c* in this embodiment are each not provided with an inner gear ring. Instead, the second sun gear 123*c* and the fourth sun gear 223*c* are employed to replace the inner gear ring. In this way, the structure is more compact, and manufacturing costs is lowered.

The first sun gear 121*c* is arranged symmetrically with respect to the third sun gear 221*c*. The second sun gear 123*c* is arranged symmetrically with respect to the fourth sun gear 223*c*. The first planetary gear 122*c* is arranged symmetrically with respect to the third planetary gear 222*c*. The second planetary gear 125*c* is arranged symmetrically with respect to the fourth planetary gear 225*c*. The first planetary carrier 124*c* is arranged symmetrically with respect to the second planetary carrier 224*c*.

Gears of the first planetary gear mechanism 12*c* are arranged with respect to gears of the second planetary gear mechanism 22*c* in a positionally symmetrical manner, so that forces on the opposite sides of the vehicle are balanced. The first motor 11*c* is connected to the first sun gear 121*c* of the first planetary gear mechanism 12*c*, and the second motor 21*c* is connected to the fourth sun gear 223*c* of the second planetary gear mechanism 22*c*. Power is inputted from the first sun gear 121*c* to the first planetary gear mechanism 12*c* and inputted from the fourth sun gear 223*c* to the second planetary gear mechanism 22*c*. In this way, an order separation of the first planetary gear mechanism 12*c* and the second planetary gear mechanism 22*c* can be realized, thereby avoiding an order overlap of the first planetary gear mechanism 12*c* and the second planetary gear mechanism 22*c*. As a result, order noise when the first planetary gear mechanism 12*c* and the second planetary gear mechanism 22*c* operate simultaneously can be significantly reduced, improving NVH performance of the vehicle and obtaining a better driving experience. Meanwhile, the first motor 11*c* and the second motor 21*c* may each be a motor with low power. When the first motor 11*c* and the second motor 21*c* operate simultaneously, the double-motor electric drive assembly 100*c* may output larger power to satisfy high-power output requirements of the vehicle. Since the first motor 11*c* and the second motor 21*c* may be controlled separately, power output at a side or two sides of the vehicle may be changed as power requirements, to realize functions of vehicle differential speed, differential lock, vector control, and the like, making control more accurate. For example, by respectively controlling rotational speeds and torques of the first motor 11c and the second motor 21c, differential speed and torque distribution between vehicle wheels may be realized, allowing for straight traveling of the vehicle.

Fifth Embodiment

Figure 5:
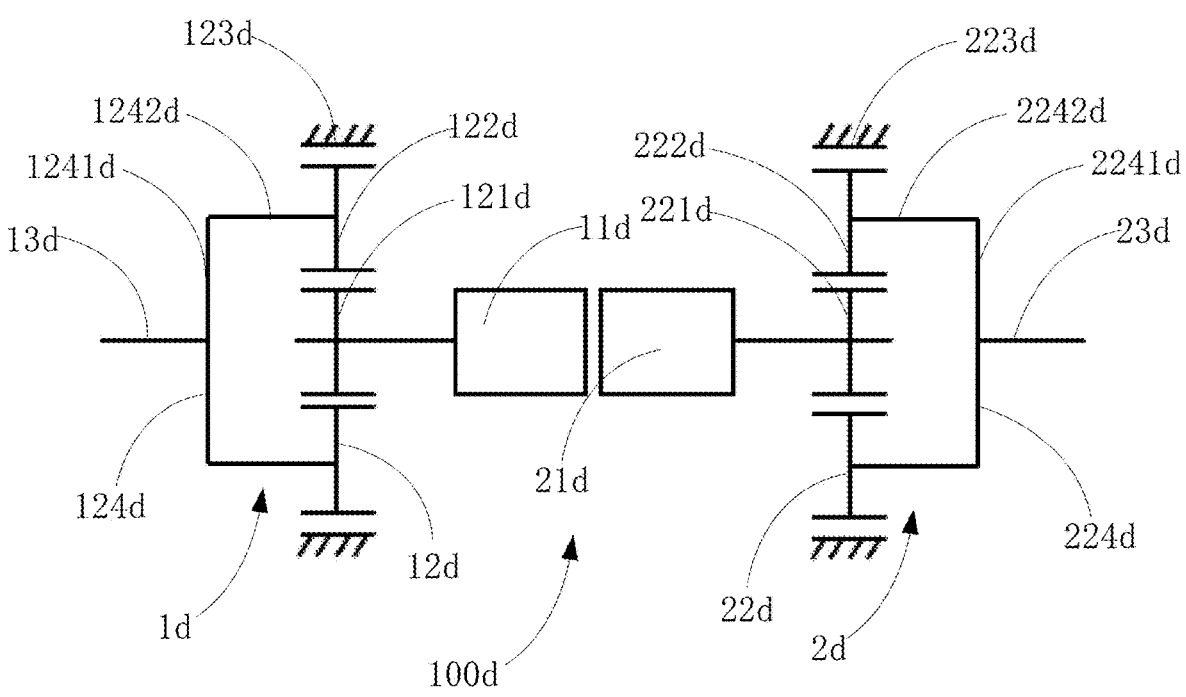
FIG. 5 is a schematic view of a double-motor electric drive assembly according to a fifth embodiment of the present disclosure.

As illustrated in FIG. 5, FIG. 5 illustrates a structure of a double-motor electric drive assembly 100d according to the fifth embodiment. The double-motor electric drive assembly 100d is mounted on a vehicle and provides the vehicle with driving power. The vehicle may be a pure electric vehicle.

The double-motor electric drive assembly 100d includes a first drive mechanism 1d and a second drive mechanism 2d. The first drive mechanism 1d and the second drive mechanism 2d may be provided at one drive axle.

The first drive mechanism 1d includes a first motor 11d, a first gear transmission mechanism 12d, and a first half shaft 13d. The first gear transmission mechanism 12d is provided between the first half shaft 13d and the first motor 11d. A main shaft of the first motor 11d is connected to the first gear transmission mechanism 12d, and the first gear transmission mechanism 12d is connected to the first half shaft 13d. The first gear transmission mechanism 12d may be a speed reducer. After reducing a speed of a torque outputted by the first motor 11d and increasing the outputted torque, the first gear transmission mechanism 12d may transmit the torque to the first half shaft 13d to drive the first half shaft 13d to rotate.

The second drive mechanism 2d includes a second motor 21d, a second gear transmission mechanism 22d, and a second half shaft 23d. The second gear transmission mechanism 22d is provided between the second half shaft 23d and the second motor 21d. A main shaft of the second motor 21d is connected to the second gear transmission mechanism 22d, and the second gear transmission mechanism 22d is connected to the second half shaft 23d. The second gear transmission mechanism 22d may be a speed reducer. After reducing a speed of a torque outputted by the second motor 21d and increasing the outputted torque, the second gear transmission mechanism 22d may transmit the torque to the second half shaft 23d to drive the second half shaft 23d to rotate. The first motor 11d and the second motor 21d are provided between the first gear transmission mechanism 12d and the second gear transmission mechanism 22d. The first half shaft 13d is provided at a side of the first gear transmission mechanism 12d facing away from the second gear transmission mechanism 22d. The second half shaft 23d is provided at a side of the second gear transmission mechanism 22d facing away from the first gear transmission mechanism 12d. The first half shaft 13d, the second half shaft 23d, the main shaft of the first motor 11d, and the main shaft of the second motor 21d are arranged coaxially.

Gears of the first gear transmission mechanism 12d are arranged with respect to gears of the second gear transmission mechanism 22d in a positionally symmetrical manner, and such a positionally symmetrical arrangement is a positionally mirror symmetrical arrangement. That is, for each gear of the first gear transmission mechanism 12d, there is a gear in the second gear transmission mechanism 22d arranged with respect to the gear of the first gear transmission mechanism 12d in a positionally symmetrical manner. The number of teeth of at least two gears arranged symmetrically with respect to each other of the first gear transmission mechanism 12d and the second gear transmission mechanism 22d are different.

Since the numbers of the teeth of the at least two gears arranged symmetrically with respect to each other of the first gear transmission mechanism 12d and the second gear transmission mechanism 22d are different, the first gear transmission mechanism 12d is not identical with the second gear transmission mechanism 22d, and an order separation of the first gear transmission mechanism 12d and the second gear transmission mechanism 22d can be realized, thereby avoiding an order overlap of the first gear transmission mechanism 12d and the second gear transmission mechanism 22d. As a result, order noise when the first gear transmission mechanism 12d and the second gear transmission mechanism 22d operate simultaneously can be significantly reduced, improving NVH performance of the vehicle and obtaining a better driving experience. Meanwhile, the first motor 11d and the second motor 21d may each be a motor with low power. When the first motor 11d and the second motor 21d operate simultaneously, the double-motor electric drive assembly 100d may output larger power to satisfy high-power output requirements of the vehicle. Since the first motor 11d and the second motor 21d may be controlled separately, power output at a side or two sides of the vehicle may be changed as power requirements, to realize functions of vehicle differential speed, differential lock, vector control, and the like, making control more accurate. For example, by respectively controlling rotational speeds and torques of the first motor 11d and the second motor 21d, differential speed and torque distribution between vehicle wheels may be realized, allowing for straight traveling of the vehicle.

In an exemplary embodiment, the first gear transmission mechanism 12d is constructed as a single-row planetary gear mechanism. The first gear transmission mechanism 12d includes a first sun gear 121d, a first planetary gear 122d, a first inner gear ring 123d, and a first planetary carrier 124d. The first inner gear ring 123d is disposed to remain stationary and is unmovable. The first sun gear 121d is provided in the first inner gear ring 123d and arranged coaxially with the first inner gear ring 123d. The main shaft of the first motor 11d is arranged coaxially with the first sun gear 121d, and the first sun gear 121d is sleeved over the main shaft of the first motor 11d. There is an annular gap between the first sun gear 121d and the first inner gear ring 123d. The first planetary gear 122d is provided in the annular gap between the first sun gear 121d and the first inner gear ring 123d. An axis of the first planetary gear 122d is parallel to an axis of the first sun gear 121d. Each of the first sun gear 121d and the first inner gear ring 123d is engaged with the first planetary gear 122d. A plurality of first planetary gears 122d may be provided. For example, three first planetary gears 122d may be provided. The plurality of first planetary gears 122 are evenly distributed in a circumferential direction of the first sun gear 121d. The first planetary carrier 124d includes a first support 1241d and a first rotary shaft 1242d. The first support 1241d is provided at a side of the first sun gear 121d facing away from the first motor 11d. The first rotary shaft 1242d is parallel to the axis of the first sun gear 121d and has an end connected to the first support 1241d. The number of first rotary shafts 1242d is the same as the number of first planetary gears 122d. The first rotary shafts 1242d are in one-to-one correspondence with the first planetary gears 122d. Each of the first planetary gears 122d is sleeved over one of the first rotary shafts 1242d corresponding to the first planetary gears 122d and is rotatable around the first rotary shafts 1242d. The first half shaft 13d is provided at a side of the first support 1241d facing away from the first sun gear 121d and is arranged coaxially with the first sun gear 121d. An end of the first half shaft 13d is connected to the first support 1241d of the first planetary carrier 124d.

A torque outputted by the main shaft of the first motor 11d passes through the first sun gear 121d, the first planetary gear 122d, the first inner gear ring 123d, and the first planetary carrier 124d sequentially, and is transmitted to the first half shaft 13d to drive the first half shaft 13d to rotate. The second half shaft 23d may be externally connected to the vehicle wheels and respectively drive the vehicle wheels to rotate.

The second gear transmission mechanism 22d is constructed as a planetary gear mechanism. The second gear transmission mechanism 22d includes a second sun gear 221d, a second planetary gear 222d, a second inner gear ring 223d, and a second planetary carrier 224d. The second inner gear ring 223d is disposed to remain stationary and is unmovable. The second sun gear 221d is provided in the second inner gear ring 223d and arranged coaxially with the second inner gear ring 223d. A main shaft of the second motor 21d is arranged coaxially with the second sun gear 221d, and the second sun gear 221d is sleeved over the main shaft of the second motor 21d. There is an annular gap between the second sun gear 221d and the second inner gear ring 223d. The second planetary gear 222d is provided in the annular gap between the second sun gear 221d and the second inner gear ring 223d. An axis of the second planetary gear 222d is parallel to an axis of the second sun gear 221d. Each of the second sun gear 221d and the second inner gear ring 223d is engaged with the second planetary gear 222d. A plurality of second planetary gears 222d may be provided. For example, three second planetary gears 222d may be provided. The plurality of second planetary gears 122 are evenly distributed in a circumferential direction of the second sun gear 221d. The second planetary carrier 224d includes a second support 2241d and a second rotary shaft 2242d. The second support 2241d is provided at a side of the second sun gear 221d facing away from the second motor 21d. The second rotary shaft 2242d is parallel to the axis of the second sun gear 221d and has an end connected to the second support 2241d. The number of second rotary shafts 2242d is the same as the number of second planetary gears 222d. The second rotary shafts 2242d are in one-to-one correspondence with the second planetary gears 222d. Each of the second planetary gears 222d is sleeved over one of the second rotary shafts 2242d corresponding to the second planetary gear 222d and is rotatable around the second rotary shaft 2242d. The second half shaft 23d is provided at a side of the second support 2241d facing away from the second sun gear 221d and is arranged coaxially with the second sun gear 221d. An end of the second half shaft 23d is connected to the second support 2241d of the second planetary carrier 224d.

A torque outputted by the main shaft of the second motor 21d passes through the second sun gear 221d, the second planetary gear 222d, the second inner gear ring 223d, and the second planetary carrier 224d sequentially, and is transmitted to the second half shaft 23d to drive the second half shaft 23d to rotate. The second half shaft 23d may be externally connected to the vehicle wheels and respectively drive the vehicle wheels to rotate.

In this embodiment, each of the first gear transmission mechanism 12d and the second gear transmission mechanism 22d is the single-row planetary gear mechanism and is compact in structure and high in reliability as the speed reducer.

The first sun gear 121d is arranged symmetrically with respect to the second sun gear 221d. The first planetary gear 122d is arranged symmetrically with respect to the second planetary gear 222d. The first inner gear ring 123d is arranged symmetrically with respect to the second inner gear ring 223d. The first planetary carrier 124d is arranged symmetrically with respect to the second planetary carrier 224d. At least one of the number of teeth of the first sun gear 121d and the second sun gear 221d, the numbers of teeth of the first planetary gear 122d and the second planetary gear 222d, and the numbers of teeth of the first inner gear ring 123d and the second inner gear ring 223d are different, so that the first gear transmission mechanism 12d is not completely symmetric with respect to the second gear transmission mechanism 22d, thereby reducing the order noise when the first gear transmission mechanism 12d and the second gear transmission mechanism 22d operate simultaneously.

In an exemplary embodiment, the number of teeth of the first sun gear 121d is different from the number of teeth of the second sun gear 221d, the number of teeth of the first planetary gear 122d is different from the number of teeth of the second planetary gear 222d, and the number of teeth of the first inner gear ring 123d is different from the number of teeth of the second inner gear ring 223d.

In this way, numbers of teeth of all the gears arranged symmetrically with respect to each other are different. Therefore, the order noise when the first gear transmission mechanism 12d and the second gear transmission mechanism 22d operate simultaneously can be further reduced, improving the NVH performance of the vehicle and obtaining the better driving experience.

Sixth Embodiment

Figure 6:
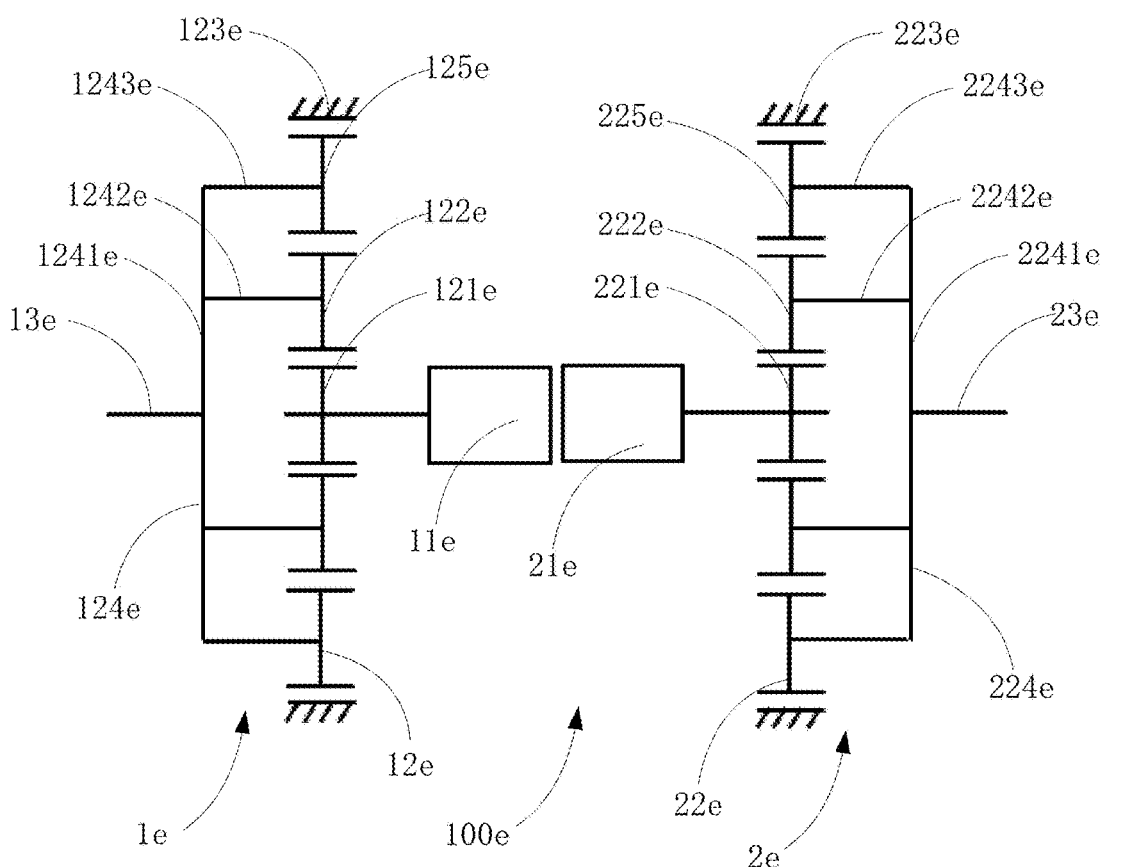
FIG. 6 is a schematic view of a double-motor electric drive assembly according to a sixth embodiment of the present disclosure.

As illustrated in FIG. 6, FIG. 6 illustrates a structure of a double-motor electric drive assembly 100e according to the sixth embodiment. The double-motor electric drive assembly 100e is mounted on a vehicle and provides the vehicle with driving power. The vehicle may be a pure electric vehicle.

The double-motor electric drive assembly 100e includes a first drive mechanism 1e and a second drive mechanism 2e. The first drive mechanism 1e and the second drive mechanism 2e may be provided at one drive axle. The first drive mechanism 1e includes a first motor 11e, a first gear transmission mechanism 12e, and a first half shaft 13e. The first gear transmission mechanism 12e is provided between the first half shaft 13e and the first motor 11e. A main shaft of the first motor 11e is connected to the first gear transmission mechanism 12e, and the first gear transmission mechanism 12e is connected to the first half shaft 13e. The first gear transmission mechanism 12e may be a speed reducer. After reducing a speed of a torque outputted by the first motor 11e and increasing the outputted torque, the first gear transmission mechanism 12e may transmit the torque to the first half shaft 13e to drive the first half shaft 13e to rotate.

The second drive mechanism 2e includes a second motor 21e, a second gear transmission mechanism 22e, and a second half shaft 23e. The second gear transmission mechanism 22e is provided between the second half shaft 23e and the second motor 21e. A main shaft of the second motor 21e is connected to the second gear transmission mechanism 22e, and the second gear transmission mechanism 22e is connected to the second half shaft 23e. The second gear transmission mechanism 22e may be a speed reducer. After reducing a speed of a torque outputted by the second motor 21e and increasing the outputted torque, the second gear transmission mechanism 22e may transmit the torque to the second half shaft 23e to drive the second half shaft 23e to rotate. The first motor 11e and the second motor 21e are provided between the first gear transmission mechanism 12e and the second gear transmission mechanism 22e. The first half shaft 13e is provided at a side of the first gear transmission mechanism 12e facing away from the second gear transmission mechanism 22e. The second half shaft 23e is provided at a side of the second gear transmission mechanism 22e facing away from the first gear transmission mechanism 12e. The first half shaft 13e, the second half shaft 23e, the main shaft of the first motor 11e, and the main shaft of the second motor 21e are arranged coaxially.

In this embodiment, the first gear transmission mechanism 12e is constructed as a longitudinal double-row planetary gear mechanism. The first gear transmission mechanism 12e includes a first sun gear 121e, a first planetary gear 122e, a second planetary gear 125e, a first inner gear ring 123e, and a first planetary carrier 124e. The first inner gear ring 123e is disposed to remain stationary and is unmovable. The first sun gear 121e is provided in the first inner gear ring 123e and arranged coaxially with the first inner gear ring 123e. The main shaft of the first motor 11e is arranged coaxially with the first sun gear 121e, and the first sun gear 121e is sleeved over the main shaft of the first motor 11e. There is an annular gap between the first sun gear 121e and the first inner gear ring 123e. Each of the first planetary gear 122e and the second planetary gear 125e is provided in the annular gap between the first sun gear 121e and the first inner gear ring 123e. Axes of the first planetary gear 122e and the second planetary gear 125e are both parallel to an axis of the first sun gear 121e. A plurality of first planetary gears 122e may be provided. For example, three first planetary gears 122e may be provided. The plurality of first planetary gears 122 are evenly distributed in a circumferential direction of the first sun gear 121e. The plurality of first planetary gears 122e are engaged with the first sun gear 121e. The number of second planetary gears 125e is the same as the number of first planetary gears 122e. The first planetary gears 122e are in one-to-one correspondence with the second planetary gears 125e. Each of the second planetary gears 125e is engaged with one of the first planetary gears 122e corresponding to the second planetary gear 125e and is engaged with the first inner gear ring 123e.

The first planetary carrier 124e includes a first support 1241e, a first rotary shaft 1242e, and a second rotary shaft 1243e. The first support 1241e is provided at a side of the first sun gear 121e facing away from the first motor 11e. Each of the first rotary shaft 1242e and the second rotary shaft 1243e is parallel to the axis of the first sun gear 121e. Each of an end of the first rotary shaft 1242e and an end of the second rotary shaft 1243e is connected to the first support 1241e. The number of first rotary shafts 1242e is the same as the number of first planetary gears 122e. The first rotary shafts 1242e are in one-to-one correspondence with the first planetary gears 122e. Each of the first planetary gears 122e is sleeved over one of the first rotary shafts 1242e corresponding to the first planetary gear 122e and is rotatable around the first rotary shaft 1242e. The number of second rotary shafts 1243e is the same as the number of second planetary gears 125e. The second rotary shafts 1243e are in one-to-one correspondence with the second planetary gears 125e. Each of the second planetary gears 125e is sleeved over one of the second rotary shafts 1243e corresponding to the second planetary gear 125e and is rotatable around the second rotary shaft 1243e. The first half shaft 13e is provided at a side of the first support 1241e facing away from the first sun gear 121e and is arranged coaxially with the first sun gear 121e. An end of the first half shaft 13e is connected to the first support 1241e of the first planetary carrier 124e.

A torque outputted by the main shaft of the first motor 11e passes through the first sun gear 121e, the first planetary gear 122e, the second planetary gear 125e, the first inner gear ring 123e, and the first planetary carrier 124e sequentially, and is transmitted to the first half shaft 13e to drive the first half shaft 13e to rotate.

In this embodiment, the second gear transmission mechanism 22e is constructed as a longitudinal double-row planetary gear mechanism. The second gear transmission mechanism 22e includes a second sun gear 221e, a third planetary gear 222e, a fourth planetary gear 225e, a second inner gear ring 223e, and a second planetary carrier 224e. The second inner gear ring 223e is disposed to remain stationary and is unmovable. The second sun gear 221e is provided in the second inner gear ring 223e and arranged coaxially with the second inner gear ring 223e. The main shaft of the second motor 21e is arranged coaxially with the second sun gear 221e, and the second sun gear 221e is sleeved over the main shaft of the second motor 21e. There is an annular gap between the second sun gear 221e and the second inner gear ring 223e. Each of the third planetary gear 222e and the fourth planetary gear 225e is provided in the annular gap between the second sun gear 221e and the second inner gear ring 223e. Axes of the third planetary gear 222e and the fourth planetary gear 225e are both parallel to an axis of the second sun gear 221e. A plurality of third planetary gears 222e may be provided. For example, three third planetary gears 222e may be provided. The plurality of third planetary gears 122 are evenly distributed in a circumferential direction of the second sun gear 221e. The plurality of third planetary gears 222e are engaged with the second sun gear 221e. The number of fourth planetary gears 225e is the same as the number of third planetary gears 222e. The third planetary gears 222e are in one-to-one correspondence with the fourth planetary gears 225e. Each of the third planetary gears 222e is engaged with one of the fourth planetary gears 225e corresponding to the third planetary gear 222e and is engaged with the second inner gear ring 223e.

The second planetary carrier 224e includes a second support 2241e, a third rotary shaft 2242e, and a fourth rotary shaft 2243e. The second support 2241e is provided at a side of the second sun gear 221e facing away from the second motor 21e. Each of the third rotary shaft 2242e and the fourth rotary shaft 2243e is parallel to the axis of the second sun gear 221e. Each of an end of the third rotary shaft 2242e and an end of the fourth rotary shaft 2243e is connected to the first support 1241e. The number of third rotary shafts 2242e is the same as the number of third planetary gears 222e. The third rotary shafts 2242e are in one-to-one correspondence with the third planetary gears 222e. Each of the third planetary gears 222e is sleeved over one of the third rotary shafts 2242e corresponding to the third planetary gear 222e and is rotatable around the third rotary shafts 2242e. The number of fourth rotary shafts 2243e is the same as the number of fourth planetary gears 225e. The fourth rotary shafts 2243e are in one-to-one correspondence with the fourth planetary gears 225e. Each of the fourth planetary gears 225e is sleeved over one of the fourth rotary shafts 2243e corresponding to the fourth planetary gear 225e and is rotatable around the fourth rotary shaft 2243e. The second half shaft 23e is provided at a side of the second support 2241e facing away from the second sun gear 221e and is arranged coaxially with the second sun gear 221e. An end of the second half shaft 23e is connected to the second support 2241e of the second planetary carrier 224e.

A torque outputted by the main shaft of the second motor 21e passes through the second sun gear 221e, the third planetary gear 222e, the fourth planetary gear 225e, the second inner gear ring 223e, and the second planetary carrier 224e sequentially, and is transmitted to the second half shaft 23e to drive the second half shaft 23e to rotate.

In this embodiment, each of the first gear transmission mechanism 12e and the second gear transmission mechanism 22e is the longitudinal double-row planetary gear mechanism. A transmission ratio of the first gear transmission mechanism 12e and a transmission ratio of the second gear transmission mechanism 22e are greater than that of a single-row planetary gear mechanism.

The first sun gear 121e is arranged symmetrically with respect to the second sun gear 221e. The first planetary gear 122e is arranged symmetrically with respect to the third planetary gear 222e. The second planetary gear 125e is arranged symmetrically with respect to the fourth planetary gear 225e. The first inner gear ring 123e is arranged symmetrically with respect to the second inner gear ring 223e, and the first planetary carrier 124a is arranged symmetrically with respect to the second planetary carrier 224e. At least one of numbers of teeth of the first sun gear 121e and the second sun gear 221e, numbers of teeth of the first planetary gear 122e and the third planetary gear 222e, numbers of teeth of the second planetary gear 125e and the fourth planetary gear 225e, and numbers of teeth of the first inner gear ring 123e and the second inner gear ring 223e are different.

Since numbers of teeth of at least one group of gears arranged symmetrically with respect to each other of the first gear transmission mechanism 12e and the second gear transmission mechanism 22e are different, the first gear transmission mechanism 12e is not completely symmetric with respect to the second gear transmission mechanism 22e. As a result, an order separation of the first gear transmission mechanism 12e and the second gear transmission mechanism 22e can be realized, thereby avoiding an order overlap of the first gear transmission mechanism 12e and the second gear transmission mechanism 22e. In this way, order noise when the first gear transmission mechanism 12d and the second gear transmission mechanism 22d operate simultaneously can be significantly reduced, improving NVH performance of the vehicle and obtaining a better driving experience. Meanwhile, the first motor 11e and the second motor 21e may each be a motor with low power. When the first motor 11e and the second motor 21e operate simultaneously, the double-motor electric drive assembly 100e may output larger power to satisfy high-power output requirements of the vehicle. Since the first motor 11e and the second motor 21e may be controlled separately, power output at a side or two sides of the vehicle may be changed as power requirements, to realize functions of vehicle differential speed, differential lock, vector control, and the like, making control more accurate. For example, by respectively controlling rotational speeds and torques of the first motor 11e and the second motor 21e, differential speed and torque distribution between vehicle wheels may be realized, allowing for straight traveling of the vehicle.

In an exemplary embodiment, the number of teeth of the first sun gear 121e is different from the number of teeth of the second sun gear 221e, the number of teeth of the first planetary gear 122e is different from the number of teeth of the third planetary gear 222e, the number of teeth of the second planetary gear 125e is different from the number of teeth of the fourth planetary gear 225e, and the number of teeth of the first inner gear ring 123e is different from the number of teeth of the second inner gear ring 223e.

In this way, numbers of teeth of all the gears arranged symmetrically with respect to each other are different. Therefore, the order noise when the first gear transmission mechanism 12e and the second gear transmission mechanism 22e operate simultaneously can be further reduced, improving the NVH performance of the vehicle and obtaining the better driving experience.

Seventh Embodiment

Figure 7:
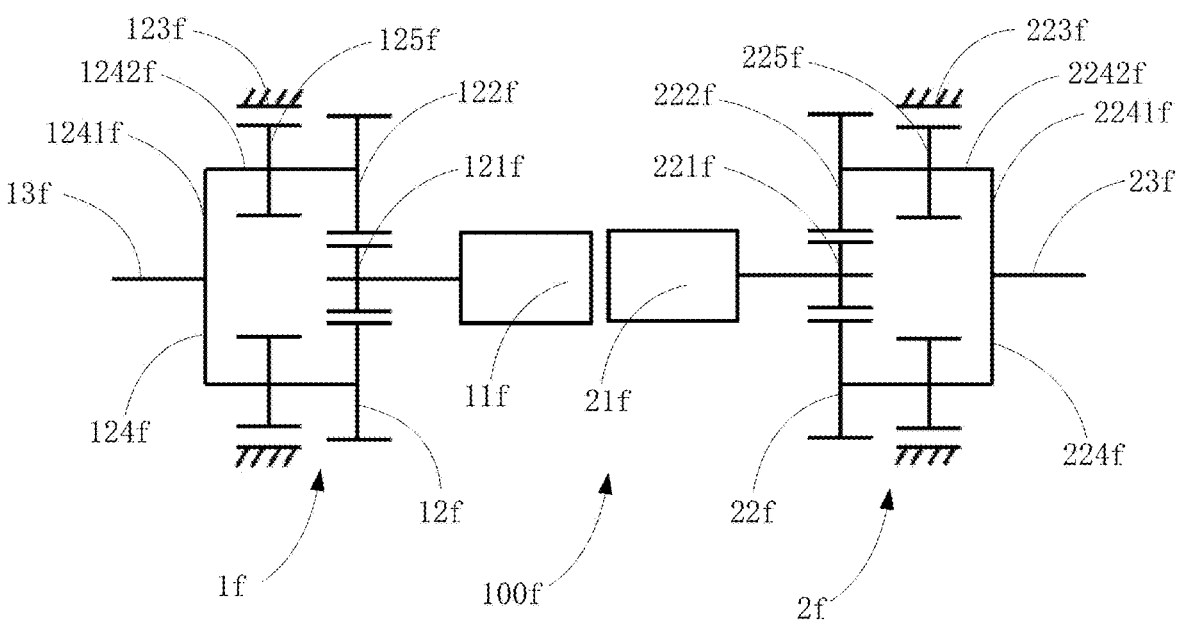
FIG. 7 is a schematic view of a double-motor electric drive assembly according to a seventh embodiment of the present disclosure.

As illustrated in FIG. 7, FIG. 7 illustrates a structure of a double-motor electric drive assembly 100f according to the seventh embodiment. The double-motor electric drive assembly 100f is mounted on a vehicle and provides the vehicle with driving power. The vehicle may be a pure electric vehicle.

The double-motor electric drive assembly 100f includes a first drive mechanism 1f and a second drive mechanism 2f. The first drive mechanism 1f and the second drive mechanism 2f may be provided at one drive axle. The first drive mechanism 1f includes a first motor 11f, a first gear transmission mechanism 12f, and a first half shaft 13f. The first gear transmission mechanism 12f is provided between the first half shaft 13f and the first motor 11f. A main shaft of the first motor 11f is connected to the first gear transmission mechanism 12f, and the first gear transmission mechanism 12f is connected to the first half shaft 13f. The first gear transmission mechanism 12f may be a speed reducer. After reducing a speed of a torque outputted by the first motor 11f and increasing the outputted torque, the first gear transmission mechanism 12f may transmit the torque to the first half shaft 13f to drive the first half shaft 13f to rotate.

The second drive mechanism 2f includes a second motor 21f, a second gear transmission mechanism 22f, and a second half shaft 23f. The second gear transmission mechanism 22f is provided between the second half shaft 23f and the second motor 21f. A main shaft of the second motor 21f is connected to the second gear transmission mechanism 22f, and the second gear transmission mechanism 22f is connected to the second half shaft 23f. The second gear transmission mechanism 22f may be a speed reducer. After reducing a speed of a torque outputted by the second motor 21f and increasing the outputted torque, the second gear transmission mechanism 22f may transmit the torque to the second half shaft 23f to drive the second half shaft 23f to rotate. The first motor 11f and the second motor 21f are provided between the first gear transmission mechanism 12f and the second gear transmission mechanism 22f. The first half shaft 13f is provided at a side of the first gear transmission mechanism 12f facing away from the second gear transmission mechanism 22f. The second half shaft 23f is provided at a side of the second gear transmission mechanism 22f facing away from the first gear transmission mechanism 12f. The first half shaft 13f, the second half shaft 23f, the main shaft of the first motor 11f, and the main shaft of the second motor 21f are arranged coaxially.

In this embodiment, the first gear transmission mechanism 12f is constructed as a transverse double-row planetary gear mechanism. The first gear transmission mechanism 12f includes a first sun gear 121f, a first planetary gear 122f, a second planetary gear 125f, a first inner gear ring 123f, and a first planetary carrier 124f. The first inner gear ring 123f is disposed to remain stationary and is unmovable. The first sun gear 121f is provided at a side of the first inner gear ring 123*f* close to the first motor 11*f*, and is arranged coaxially with the first inner gear ring 123*f*. Further, the first sun gear 121*f* has an outer diameter smaller than an inner diameter of the first inner gear ring 123*f*. The main shaft of the first motor 11*f* is arranged coaxially with the first sun gear 121*f*, and the first sun gear 121*f* is sleeved over the main shaft of the first motor 11*f*.

Axes of the first planetary gear 122*f* and the second planetary gear 125*f* are both parallel to an axis of the first sun gear 121*f*. A plurality of first planetary gears 122*f* may be provided. For example, three first planetary gears 122*f* may be provided. The plurality of first planetary gears 122 are evenly distributed in a circumferential direction of the first sun gear 121*f*. The plurality of first planetary gears 122*f* are engaged with the first sun gear 121*f*. The number of second planetary gears 125*f* is the same as the number of first planetary gears 122*f*. The first planetary gears 122*f* are in one-to-one correspondence with the second planetary gears 125*f*. Each of the second planetary gear 125*f* is arranged coaxially with one of the first planetary gears 122*f* corresponding to the second planetary gear 125*f*, and is engaged with the first inner gear ring 123*f*. The first planetary gear 122*f* has a greater outer diameter than the second planetary gear 125*f*.

The first planetary carrier 124*f* includes a first support 1241*f* and a first rotary shaft 1242*f*. The first support 1241*f* is provided at a side of the second planetary gear 125*f* facing away from the first planetary gear 122*f*. The first rotary shaft 1242*f* is parallel to the axis of the first sun gear 121*f* and has an end connected to the first support 1241*f*. The number of first rotary shafts 1242*f* is the same as the number of first planetary gears 122*f*. The first rotary shafts 1242*f* are in one-to-one correspondence with the first planetary gears 122*f*. The first rotary shafts 1242*f* are in one-to-one correspondence with the second planetary gears 125*f*. Each of the first planetary gears 122*f* is sleeved over one of the first rotary shafts 1242*f* corresponding to the first planetary gear 122*f* and is rotatable around the first rotary shaft 1242*f*. Each of the second planetary gears 125*f* is sleeved over one of the first rotary shafts 1242*f* corresponding to the second planetary gears 125*f* and is rotatable around the first rotary shaft 1242*f*. The first half shaft 13*f* is provided at a side of the first support 1241*f* facing away from the first sun gear 121*f* and is arranged coaxially with the first sun gear 121*f*. An end of the first half shaft 13*f* is connected to the first support 1241*f* of the first planetary carrier 124*f*.

A torque outputted by the main shaft of the first motor 11*f* is transmitted to the first half shaft 13*f* by the first gear transmission mechanism 12*f* to drive the first half shaft 13*f* to rotate.

In this embodiment, the second gear transmission mechanism 22*f* is constructed as a transverse double-row planetary gear mechanism. The second gear transmission mechanism 22*f* includes a second sun gear 221*f*, a third planetary gear 222*f*, a fourth planetary gear 225*f*, a second inner gear ring 223*f*, and a second planetary carrier 224*f*. The second inner gear ring 223*f* is disposed to remain stationary and is unmovable. The second sun gear 221*f* is provided at a side of the second inner gear ring 223*f* close to the second motor 21*f*, and is arranged coaxially with the second inner gear ring 223*f*. Further, the second sun gear 221*f* has an outer diameter smaller than an inner diameter of the second inner gear ring 223*f*. The main shaft of the second motor 21*f* is arranged coaxially with the second sun gear 221*f*, and the second sun gear 221*f* is sleeved over the main shaft of the second motor 21*f*.

Axes of the third planetary gear 222*f* and the fourth planetary gear 225*f* are both parallel to an axis of the second sun gear 221*f*. A plurality of third planetary gears 222*f* may be provided. For example, three third planetary gears 222*f* may be provided. The plurality of third planetary gears 122 are evenly distributed in a circumferential direction of the second sun gear 221*f*. Each of the plurality of third planetary gears 222*f* is engaged with the second sun gear 221*f*. The number of fourth planetary gears 225*f* is the same as the number of third planetary gears 222*f*. The third planetary gears 222*f* are in one-to-one correspondence with the fourth planetary gears 225*f*. Each of the fourth planetary gears 225*f* is provided in the second inner gear ring 223*f*. Each of the fourth planetary gear 225*f* is arranged coaxially with one of the third planetary gears 222*f* corresponding to the fourth planetary gear 225*f*, and is engaged with the second inner gear ring 223*f*. The third planetary gear 222*f* has a greater outer diameter than the fourth planetary gear 225*f*.

The second planetary carrier 224*f* includes a second support 2241*f* and a second rotary shaft 2242*f*. The second support 2241*f* is provided at a side of the fourth planetary gear 225*f* facing away from the third planetary gear 222*f*. The second rotary shaft 2242*f* is parallel to the axis of the second sun gear 221*f* and has an end connected to the second support 2241*f*. The number of second rotary shafts 2242*f* is the same as the number of third planetary gears 222*f*. The second rotary shafts 2242*f* are in one-to-one correspondence with the third planetary gears 222*f*. The second rotary shafts 2242*f* are in one-to-one correspondence with the fourth planetary gears 225*f*. Each of the third planetary gears 222*f* is sleeved over one of the second rotary shafts 2242*f* corresponding to the third planetary gear 222*f* and is rotatable around the second rotary shaft 2242*f*. Each of the fourth planetary gears 225*f* is sleeved over one of the second rotary shafts 2242*f* corresponding to the fourth planetary gear 225*f* and is rotatable around the second rotary shaft 2242*f*. The second half shaft 23*f* is provided at a side of the second support 2241*f* facing away from the second sun gear 221*f* and is arranged coaxially with the second sun gear 221*f*. An end of the second half shaft 23*f* is connected to the second support 2241*f* of the second planetary carrier 224*f*.

A torque outputted by the main shaft of the second motor 21*f* is transmitted to the second half shaft 23*f* by the second gear transmission mechanism 22*f* to drive the second half shaft 23*f* to rotate.

Since each of the first gear transmission mechanism 12*f* and the second gear transmission mechanism 22*f* is the transverse double-row planetary gear mechanism, transmission ratios of both the first gear transmission mechanism 12*f* and the second gear transmission mechanism 22*f* are greater than a transmission ratio of a single-row planetary gear mechanism. Meanwhile, the transverse double-row planetary gear mechanism has a smaller radial size than a longitudinal double-row planetary gear mechanism.

The first sun gear 121*f* is arranged symmetrically with respect to the second sun gear 221*f*. The first planetary gear 122*f* is arranged symmetrically with respect to the third planetary gear 222*f*. The second planetary gear 125*f* is arranged symmetrically with respect to the fourth planetary gear 225*f*. The first inner gear ring 123*f* is arranged symmetrically with respect to the second inner gear ring 223*f*, and the first planetary carrier 124*f* is arranged symmetrically with respect to the second planetary carrier 224*f*.

At least one of the number of teeth of the first sun gear 121*f* and the second sun gear 221*f*, numbers of teeth of the first planetary gear 122*f* and the third planetary gear 222*f*, numbers of teeth of the second planetary gear 125*f* and the fourth planetary gear 225f, and numbers of teeth of the first inner gear ring 123f and the second inner gear ring 223f are different.

Since numbers of the teeth of at least one group of gears arranged symmetrically with respect to each other of the first gear transmission mechanism 12f and the second gear transmission mechanism 22f are different, the first gear transmission mechanism 12f is not completely symmetric with respect to the second gear transmission mechanism 22f. As a result, an order separation of the first gear transmission mechanism 12f and the second gear transmission mechanism 22f can be realized, thereby avoiding an order overlap of the first gear transmission mechanism 12f and the second gear transmission mechanism 22f. In this way, order noise when the first gear transmission mechanism 12d and the second gear transmission mechanism 22f operate simultaneously can be significantly reduced, improving NVH performance of the vehicle and obtaining a better driving experience. Meanwhile, the first motor 11f and the second motor 21f may each be a motor with low power. When the first motor 11f and the second motor 21f operate simultaneously, the double-motor electric drive assembly 100f may output larger power to satisfy high-power output requirements of the vehicle. Since the first motor 11f and the second motor 21f may be controlled separately, power output at a side or two sides of the vehicle may be changed as power requirements, to realize functions of vehicle differential speed, differential lock, vector control, and the like, making control more accurate. For example, by respectively controlling rotational speeds and torques of the first motor 11f and the second motor 21f, differential speed and torque distribution between vehicle wheels may be realized, allowing for straight traveling of the vehicle.

In an exemplary embodiment, the number of teeth of the first sun gear 121f is different from the number of teeth of the second sun gear 221f, the number of teeth of the first planetary gear 122f is different from the number of teeth of the third planetary gear 222f, the number of teeth of the second planetary gear 125f is different from the number of teeth of the fourth planetary gear 225f, and the number of teeth of the first inner gear ring 123f is different from the number of teeth of the second inner gear ring 223f.

In this way, numbers of teeth of all the gears arranged symmetrically with respect to each other are different. Therefore, the order noise when the first gear transmission mechanism 12f and the second gear transmission mechanism 22f operate simultaneously can be further reduced, improving the NVH performance of the vehicle and obtaining the better driving experience.

Eighth Embodiment

Figure 8:
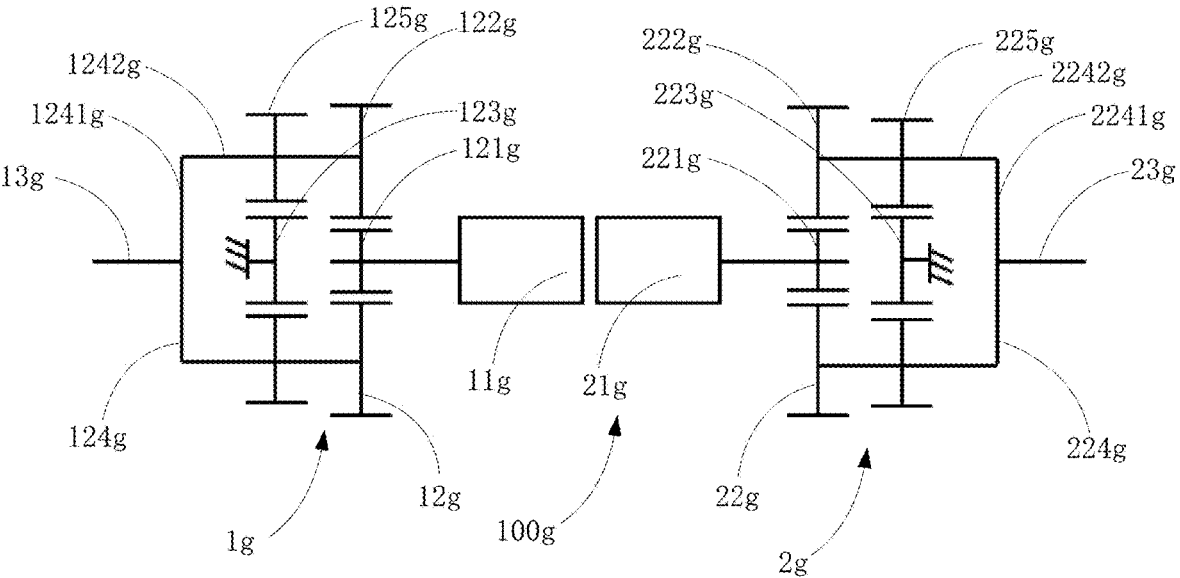
FIG. 8 is a schematic view of a double-motor electric drive assembly according to an eighth embodiment of the present disclosure.

As illustrated in FIG. 8, FIG. 8 illustrates a structure of a double-motor electric drive assembly 100g according to the eighth embodiment. The double-motor electric drive assembly 100g is mounted on a vehicle and provides the vehicle with driving power. The vehicle may be a pure electric vehicle.

The double-motor electric drive assembly 100g includes a first drive mechanism 1g and a second drive mechanism 2g. The first drive mechanism 1g and the second drive mechanism 2g may be provided at one drive axle. The first drive mechanism 1g includes a first motor 11g, a first gear transmission mechanism 12g, and a first half shaft 13g. The first gear transmission mechanism 12g is provided between the first half shaft 13g and the first motor 11g. A main shaft of the first motor 11g is connected to the first gear transmission mechanism 12g, and the first gear transmission mechanism 12g is connected to the first half shaft 13g. The first gear transmission mechanism 12g may be a speed reducer. After reducing a speed of a torque outputted by the first motor 11g and increasing the outputted torque, the first gear transmission mechanism 12g may transmit the torque to the first half shaft 13g to drive the first half shaft 13g to rotate.

The second drive mechanism 2g includes a second motor 21g, a second gear transmission mechanism 22g, and a second half shaft 23g. The second gear transmission mechanism 22g is provided between the second half shaft 23g and the second motor 21g. A main shaft of the second motor 21g is connected to the second gear transmission mechanism 22g, and the second gear transmission mechanism 22g is connected to the second half shaft 23g. The second gear transmission mechanism 22g may be a speed reducer. After reducing a speed of a torque outputted by the second motor 21g and increasing the outputted torque, the second gear transmission mechanism 22g may transmit the torque to the second half shaft 23g to drive the second half shaft 23g to rotate. The first motor 11g and the second motor 21g are provided between the first gear transmission mechanism 12g and the second gear transmission mechanism 22g. The first half shaft 13g is provided at a side of the first gear transmission mechanism 12g facing away from the second gear transmission mechanism 22g. The second half shaft 23g is provided at a side of the second gear transmission mechanism 22g facing away from the first gear transmission mechanism 12g. The first half shaft 13g, the second half shaft 23g, the main shaft of the first motor 11g, and the main shaft of the second motor 21g are arranged coaxially.

In this embodiment, the first gear transmission mechanism 12g is constructed as a transverse double-row planetary gear mechanism. The first gear transmission mechanism 12g includes a first sun gear 121g, a second sun gear 123g, a first planetary gear 122g, a second planetary gear 125g, and a first planetary carrier 124g. The first sun gear 121g is sleeved over the main shaft of the first motor 11g. The second sun gear 123g is provided at a side of the first sun gear 121g facing away from the first motor 11g. The second sun gear 123g is arranged coaxially with the first sun gear 121g. The second sun gear 123g is disposed to remain stationary. The second sun gear 123g may be fixedly sleeved over a rotary shaft that is arranged coaxially with the first sun gear 121g. Further, the second sun gear 123g is unable to rotate around the rotary shaft. An outer diameter of the second sun gear 123g may be greater than an outer diameter of the first sun gear 121g.

Axes of the first planetary gear 122g and the second planetary gear 125g are both parallel to an axis of the first sun gear 121g. A plurality of first planetary gears 122g may be provided. For example, three first planetary gears 122g may be provided. The plurality of first planetary gears 122g are evenly distributed in a circumferential direction of the first sun gear 121g. The plurality of first planetary gears 122g are engaged with the first sun gear 121g. The number of second planetary gears 125g is the same as the number of first planetary gears 122g. The plurality of second planetary gears 125g are evenly distributed in a circumferential direction of the second sun gear 123g. The first planetary gears 122g are in one-to-one correspondence with the second planetary gears 125g. Each of the second planetary gears 125g is arranged coaxially with one of the first planetary gears 122g corresponding to the second planetary gear 125g, and is engaged with the second sun gear 123g. The first planetary gear 122g has a greater outer diameter than the second planetary gear 125g.

The first planetary carrier 124g includes a first support 1241g and a first rotary shaft 1242g. The first support 1241g is provided at a side of the second planetary gear 125g facing away from the first planetary gear 122g. The first rotary shaft 1242g is parallel to the axis of the first sun gear 121g and has an end connected to the first support 1241g. The number of first rotary shafts 1242g is the same as the number of first planetary gears 122g.

The first rotary shafts 1242g are in one-to-one correspondence with the first planetary gears 122g. The first rotary shafts 1242g are in one-to-one correspondence with the second planetary gears 125g. Each of the first planetary gears 122g is sleeved over one of the first rotary shafts 1242g corresponding to the first planetary gear 122g and is rotatable around the first rotary shaft 1242g. Each of the second planetary gears 125g is sleeved over one of the first rotary shafts 1242g corresponding to the second planetary gear 125g and is rotatable around the first rotary shaft 1242g. The first half shaft 13g is provided at a side of the first support 1241g facing away from the second sun gear 123g and is arranged coaxially with the second sun gear 123g. An end of the first half shaft 13a is connected to the first support 1241g of the first planetary carrier 124g.

A torque outputted by the main shaft of the first motor 11g is transmitted to the first half shaft 13g by the first gear transmission mechanism 12g to drive the first half shaft 13g to rotate.

In this embodiment, the second gear transmission mechanism 22g is constructed as a transverse double-row planetary gear mechanism. The second gear transmission mechanism 22g includes a third sun gear 221g, a fourth sun gear 223g, a third planetary gear 222g, a fourth planetary gear 225g, and a second planetary carrier 224g. The third sun gear 221g is sleeved over the main shaft of the second motor 21g. The fourth sun gear 223g is provided at a side of the third sun gear 221g facing away from the second motor 21g. The fourth sun gear 223g is arranged coaxially with the third sun gear 221g. The fourth sun gear 223g is disposed to remain stationary. The fourth sun gear 223g may be fixedly sleeved over a rotary shaft that is arranged coaxially with the fourth sun gear 223g, and the fourth sun gear 223g is unable to rotate around the rotary shaft. The fourth sun gear 223g may have a greater outer diameter than the third sun gear 221g.

Axes of the third planetary gear 222g and the fourth planetary gear 225g are both parallel to an axis of the third sun gear 221g. A plurality of third planetary gears 222g may be provided. For example, three third planetary gears 222g may be provided. The plurality of third planetary gears 222g are evenly distributed in a circumferential direction of the third sun gear 221g. Each of the plurality of third planetary gears 222g is engaged with the third sun gear 221g. The number of fourth planetary gears 225g is the same as the number of third planetary gears 222g. The plurality of fourth planetary gears 225g are evenly distributed in a circumferential direction of the fourth sun gear 223g. The third planetary gears 222g are in one-to-one correspondence with the fourth planetary gears 225g. Each of the fourth planetary gears 225g is arranged coaxially with one of the third planetary gears 222g corresponding to the fourth planetary gear 225g, and is engaged with the fourth sun gear 223g. The third planetary gear 222g has a greater outer diameter than the fourth planetary gear 225g.

The second planetary carrier 224g includes a second support 2241g and a second rotary shaft 2242g. The second support 2241g is provided at a side of the fourth planetary gear 225g facing away from the third planetary gear 222g. The second rotary shaft 2242g is parallel to the axis of the third sun gear 221g and has an end connected to the second support 2241g. The number of second rotary shafts 2242g is the same as the number of third planetary gears 222g. The second rotary shafts 2242g are in one-to-one correspondence with the third planetary gears 222g. The second rotary shafts 2242g are in one-to-one correspondence with the fourth planetary gears 225g. Each of the third planetary gears 222g is sleeved over one of the second rotary shafts 2242g corresponding to the third planetary gears 222g and is rotatable around the second rotary shaft 2242g. Each of the fourth planetary gears 225g is sleeved over one of the second rotary shafts 2242g corresponding to the fourth planetary gear 225g and is rotatable around the second rotary shaft 2242g. The second half shaft 23g is provided at a side of the second support 2241g facing away from the second sun gear 221b, and the second half shaft 23g is arranged coaxially with the third sun gear 221g. An end of the second half shaft 23g is connected to the second support 2241g of the second planetary carrier 224g.

A torque outputted by the main shaft of the second motor 21g is transmitted to the second half shaft 23g by the second gear transmission mechanism 22g to drive the second half shaft 23g to rotate.

Since each of the first gear transmission mechanism 12g and the second gear transmission mechanism 22g is the transverse double-row planetary gear mechanism, transmission ratios of both the first gear transmission mechanism 12g and the second gear transmission mechanism 22g are greater than a transmission ratio of a single-row planetary gear mechanism. Moreover, the first gear transmission mechanism 12g and the second gear transmission mechanism 22g in this embodiment are not each provided with an inner gear ring. Instead, the second sun gear 123g and the fourth sun gear 223g are employed to replace the inner gear ring. Therefore, the structure is more compact, and manufacturing costs is lowered.

The first sun gear 121g is arranged symmetrically with respect to the third sun gear 221g. The second sun gear 123g is arranged symmetrically with respect to the fourth sun gear 223g. The first planetary gear 122g is arranged symmetrically with respect to the third planetary gear 222g. The second planetary gear 125g is arranged symmetrically with respect to the fourth planetary gear 225g. The first planetary carrier 124g is arranged symmetrically with respect to the second planetary carrier 224g. At least one of numbers of teeth of the first sun gear 121g and the third sun gear 221g, numbers of teeth of the second sun gear 123g and the fourth sun gear 223g, numbers of teeth of the first planetary gear 122g and the third planetary gear 222g, and numbers of teeth of the second planetary gear 125g and the fourth planetary gear 225g are different.

Since the numbers of teeth of at least one group of gears arranged symmetrically with respect to each other of the first gear transmission mechanism 12g and the second gear transmission mechanism 22g are different, the first gear transmission mechanism 12g is not completely symmetric with respect to the second gear transmission mechanism 22g. As a result, an order separation of the first gear transmission mechanism 12g and the second gear transmission mechanism 22g can be realized, thereby avoiding an order overlap of the first gear transmission mechanism 12g and the second gear transmission mechanism 22g. In this way, order noise when the first gear transmission mechanism 12g and the second gear transmission mechanism 22g operate simultaneously can be significantly reduced, improving NVH performance of the vehicle and obtaining a better driving experience. Meanwhile, the first motor 11$g$ and the second motor 21$g$ may each be a motor with low power. When the first motor 11$g$ and the second motor 21$g$ operate simultaneously, the double-motor electric drive assembly 100$g$ may output larger power to satisfy high-power output requirements of the vehicle. Since the first motor 11$g$ and the second motor 21$g$ may be controlled separately, power output at a side or two sides of the vehicle may be changed as power requirements, to realize functions of vehicle differential speed, differential lock, vector control, and the like, making control more accurate. For example, by respectively controlling rotational speeds and torques of the first motor 11$g$ and the second motor 21$g$, differential speed and torque distribution between vehicle wheels may be realized, allowing for straight traveling of the vehicle.

In an exemplary embodiment, the number of teeth of the first sun gear 121$g$ is different from the number of teeth of the third sun gear 221$g$, the number of teeth of the second sun gear 123$g$ is different from the number of teeth of the fourth sun gear 223$g$, the number of teeth of the first planetary gear 122$g$ is different from the number of teeth of the third planetary gear 222$g$, and the number of teeth of the second planetary gear 125$g$ is different from the number of teeth of the fourth planetary gear 225$g$.

In this way, numbers of teeth of all the gears arranged symmetrically with respect to each other are different. Therefore, the order noise when the first gear transmission mechanism 12$g$ and the second gear transmission mechanism 22$g$ operate simultaneously can be further reduced, improving the NVH performance of the vehicle and obtaining the better driving experience.

Ninth Embodiment

Figure 9:
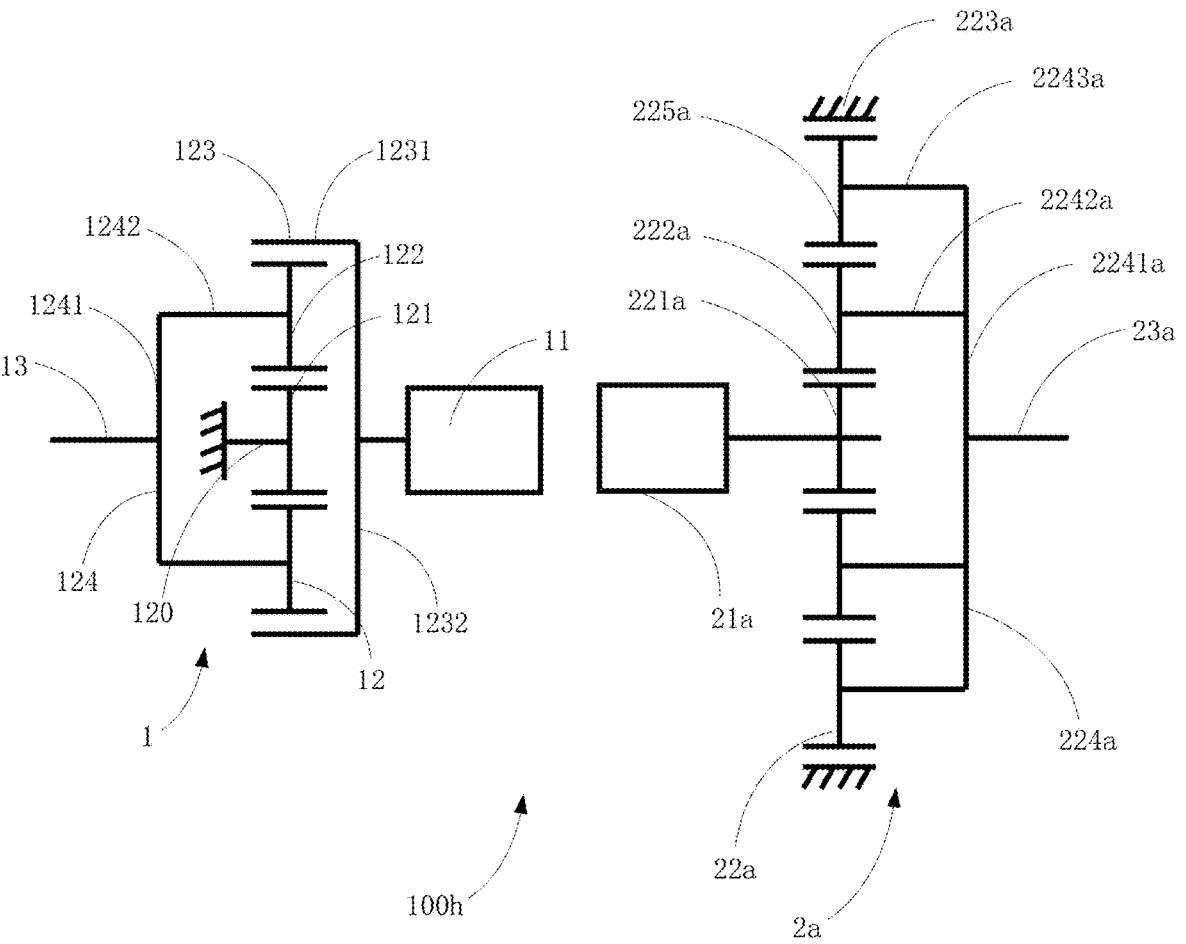
FIG. 9 is a schematic view of a double-motor electric drive assembly according to a ninth embodiment of the present disclosure.

As illustrated in FIG. 9, FIG. 9 illustrates a structure of a double-motor electric drive assembly 100$h$ according to the ninth embodiment. The double-motor electric drive assembly 100$h$ is mounted on a vehicle and provides the vehicle with driving power. The vehicle may be a pure electric vehicle.

The double-motor electric drive assembly 100$h$ includes a first drive mechanism 1 and a second drive mechanism 2$a$. The first drive mechanism 1 and the second drive mechanism 2$a$ may be provided at one drive axle.

The first drive mechanism 1 includes a first motor 11, a first planetary gear mechanism 12, and a first half shaft 13. The first planetary gear mechanism 12 is provided between the first half shaft 13 and the first motor 11. A main shaft of the first motor 11 is connected to the first planetary gear mechanism 12, and the first planetary gear mechanism 12 is connected to the first half shaft 13. The first planetary gear mechanism 12 may be a speed reducer. After reducing a speed of a torque outputted by the first motor 11 and increasing the outputted torque, the first planetary gear mechanism 12 may transmit the torque to the first half shaft 13 to drive the first half shaft 13 to rotate.

The second drive mechanism 2$a$ includes a second motor 21$a$, a second planetary gear mechanism 22$a$, and a second half shaft 23$a$. The second planetary gear mechanism 22$a$ is provided between the second half shaft 23$a$ and the second motor 21$a$. A main shaft of the second motor 21$a$ is connected to the second planetary gear mechanism 22$a$, and the second planetary gear mechanism 22$a$ is connected to the second half shaft 23$a$. The second planetary gear mechanism 22$a$ may be a speed reducer. After reducing a speed of a torque outputted by the second motor 21$a$ and increasing the outputted torque, the second planetary gear mechanism 22$a$ may transmit the torque to the second half shaft 23$a$ to drive the second half shaft 23$a$ to rotate.

The first motor 11 and the second motor 21$a$ are provided between the first planetary gear mechanism 12 and the second planetary gear mechanism 22$a$. The first half shaft 13 is provided at a side of the first planetary gear mechanism 12 facing away from the second planetary gear mechanism 22$a$, and the second half shaft 23$a$ is provided at a side of the second planetary gear mechanism 22$a$ facing away from the first planetary gear mechanism 12. The first half shaft 13, the second half shaft 23, the main shaft of the first motor 11, and the main shaft of the second motor 21$a$ are arranged coaxially.

In this embodiment, the first planetary gear mechanism 12 has a different gear arrangement pattern from the second planetary gear mechanism 22$a$.

Since the first planetary gear mechanism 12 has the different gear arrangement pattern from the second planetary gear mechanism 22$a$, an order separation of the first planetary gear mechanism 12 and the second planetary gear mechanism 22$a$ can be realized, thereby avoiding an order overlap of the first planetary gear mechanism 12 and the second planetary gear mechanism 22$a$. As a result, order noise when the first planetary gear mechanism 12 and the second planetary gear mechanism 22$a$ operate simultaneously can be significantly reduced, improving NVH performance of the vehicle and obtaining a better driving experience. Meanwhile, the first motor 11 and the second motor 21$a$ may each be a motor with low power. When the first motor 11 and the second motor 21$a$ operate simultaneously, the double-motor electric drive assembly 100$h$ may output larger power to satisfy high-power output requirements of the vehicle. Since the first motor 11 and the second motor 21$a$ may be controlled separately, power output at a side or two sides of the vehicle may be changed as power requirements, to realize functions of vehicle differential speed, differential lock, vector control, and the like, making control more accurate. For example, by respectively controlling rotational speeds and torques of the first motor 11 and the second motor 21$a$, differential speed and torque distribution between vehicle wheels may be realized, allowing for straight traveling of the vehicle.

In an exemplary embodiment, the first drive mechanism 1 is a single-row planetary gear mechanism, and the second planetary gear mechanism 2$a$ is a double-row planetary gear mechanism.

In this embodiment, the first planetary gear mechanism 12 includes a first sun gear 121, a first planetary gear 122, a first inner gear ring 123, a first planetary carrier 124, and a sun gear rotary shaft 120. The first inner gear ring 123 is arranged coaxially with the main shaft of the first motor 11. The first inner gear ring 123 includes a connector 1232 and a gear ring body 1231. The gear ring body 1231 is constructed as a circular ring shape. The connector 1232 is provided at an end of the gear ring body 1231 close to the first motor 11. The connector 1232 is connected to the gear ring body 1231 and the main shaft of the first motor 11. The sun gear rotary shaft 120 is provided in the gear ring body 1231 and is arranged coaxially with the first inner gear ring 123. The first sun gear 121 is provided in the first inner gear ring 123, and coaxially arranged with the first inner gear ring 123. Further, the first sun gear 121 is fixedly sleeved over the sun gear rotary shaft 120. The first sun gear 121 is unable to rotate around the sun gear rotary shaft 120. There is an annular gap between the first sun gear 121 and the first inner gear ring 123. The first planetary gear 122 is provided in the annular gap between the first sun gear 121 and the first inner gear ring 123. An axis of the first planetary gear 122 is parallel to an axis of the first sun gear 121.

Each of the first sun gear 121 and the first inner gear ring 123 is engaged with the first planetary gear 122. A plurality of first planetary gears 122 may be provided. For example, three first planetary gears 122 may be provided. The plurality of first planetary gears 122 are evenly distributed in a circumferential direction of the first sun gear 121. The first planetary carrier 124 includes a first support 1241 and a first rotary shaft 1242. The first support 1241 is provided at a side of the first sun gear 121 facing away from the first motor 11. The first rotary shaft 1242 is parallel to the axis of the first sun gear 121 and has an end connected to the first support 1241. The number of first rotary shafts 1242 is the same as the number of first planetary gears 122. The first rotary shafts 1242 are in one-to-one correspondence with the first planetary gears 122. Each of the first planetary gears 122 is sleeved over one of the first rotary shafts 1242 corresponding to the first planetary gear 122 and is rotatable around the first rotary shafts 1242. The first half shaft 13 is provided at a side of the first support 1241 facing away from the first sun gear 121 and is arranged coaxially with the first sun gear 121. An end of the first half shaft 13 is connected to the first support 1241 of the first planetary carrier 124.

In this embodiment, the second planetary gear mechanism 22a is constructed as a longitudinal double-row planetary gear mechanism. The second planetary gear mechanism 22a includes a second sun gear 221a, a third planetary gear 222a, a fourth planetary gear 225a, a second inner gear ring 223a, and a second planetary carrier 224a. The second inner gear ring 223a is disposed to remain stationary and is unmovable. The second sun gear 221a is provided in the second inner gear ring 223a and arranged coaxially with the second inner gear ring 223a. The main shaft of the second motor 21a is arranged coaxially with the second sun gear 221a, and the second sun gear 221a is sleeved over the main shaft of the second motor 21a. There is an annular gap between the second sun gear 221a and the second inner gear ring 223a. Each of the third planetary gear 222a and the fourth planetary gear 225a is provided in the annular gap between the second sun gear 221a and the second inner gear ring 223a. Axes of the third planetary gear 222a and the fourth planetary gear 225a are both parallel to an axis of the second sun gear 221a. A plurality of third planetary gears 222a may be provided. For example, three third planetary gears 222a may be provided. The plurality of third planetary gears 222a are evenly distributed in a circumferential direction of the second sun gear 221a. The plurality of third planetary gears 222a are engaged with the second sun gear 221a. The number of fourth planetary gears 225a is the same as the number of third planetary gears 222a. The third planetary gears 222a are in one-to-one correspondence with the fourth planetary gears 225a. Each of the third planetary gear 222a is engaged with one of the fourth planetary gears 225a corresponding to the third planetary gear 222a and is engaged with the second inner gear ring 223a.

The second planetary carrier 224a includes a second support 2241a, a third rotary shaft 2242a, and a fourth rotary shaft 2243a. The second support 2241a is provided at a side of the second sun gear 221a facing away from the second motor 21a. Each of the third rotary shaft 2242a and the fourth rotary shaft 2243a is parallel to the axis of the second sun gear 221a. Each of an end of the third rotary shaft 2242a and an end of the fourth rotary shaft 2243a is connected to the first support 1241a. The number of third rotary shafts 2242a is the same as the number of third planetary gears 222a. The third rotary shafts 2242a are in one-to-one correspondence with the third planetary gears 222a. Each of the third planetary gears 222a is sleeved over one of the third rotary shafts 2242a corresponding to the third planetary gear 222a and is rotatable around the third rotary shaft 2242a. The number of fourth rotary shafts 2243a is the same as the number of fourth planetary gears 225a. The fourth rotary shafts 2243a are in one-to-one correspondence with the fourth planetary gears 225a. Each of the fourth planetary gears 225a is sleeved over one of the fourth rotary shafts 2243a corresponding to the fourth planetary gear 225a and is rotatable around the fourth rotary shafts 2243a. The second half shaft 23a is provided at a side of the second support 2241a facing away from the second sun gear 221a and is arranged coaxially with the second sun gear 221a. An end of the second half shaft 23a is connected to the second support 2241a of the second planetary carrier 224a.

A torque outputted by the main shaft of the second motor 21a passes through the second sun gear 221a, the third planetary gear 222a, the fourth planetary gear 225a, the second inner gear ring 223a, and the second planetary carrier 224a sequentially, and is transmitted to the second half shaft 23a to drive the second half shaft 23a to rotate.

The first planetary gear mechanism 12 is a single-row planetary gear mechanism, and the second planetary gear mechanism 22a is a double-row planetary gear mechanism. A transmission ratio of the second planetary gear mechanism 22a is greater than a transmission ratio of the first planetary gear mechanism 12.

Since the first planetary gear mechanism 12 and the second planetary gear mechanism 22a are different types of planetary gear mechanisms, the first planetary gear mechanism 12 has the different gear arrangement pattern from the second planetary gear mechanism 22a, and transmission paths of torques of the first planetary gear mechanism 12 and the second planetary gear mechanism 22a are different. In this way, an order separation of the first planetary gear mechanism 12 and the second planetary gear mechanism 22a can be realized, thereby avoiding the order overlap of the first planetary gear mechanism 12 and the second planetary gear mechanism 22a. As a result, the order noise when the first planetary gear mechanism 12 and the second planetary gear mechanism 22a operate simultaneously can be significantly reduced, improving the NVH performance of the vehicle and obtaining the better driving experience.

In an exemplary embodiment, the first half shaft 13, the first planetary gear mechanism 12, the first motor 11, the second motor 21a, the second planetary gear mechanism 22a, and the second half shaft 23a are coaxially arranged sequentially.

With this arrangement, the double-motor electric drive assembly can extend along the drive axle and has a small radial size, a compact structure, and a small occupied space.

Tenth Embodiment

Figure 10:
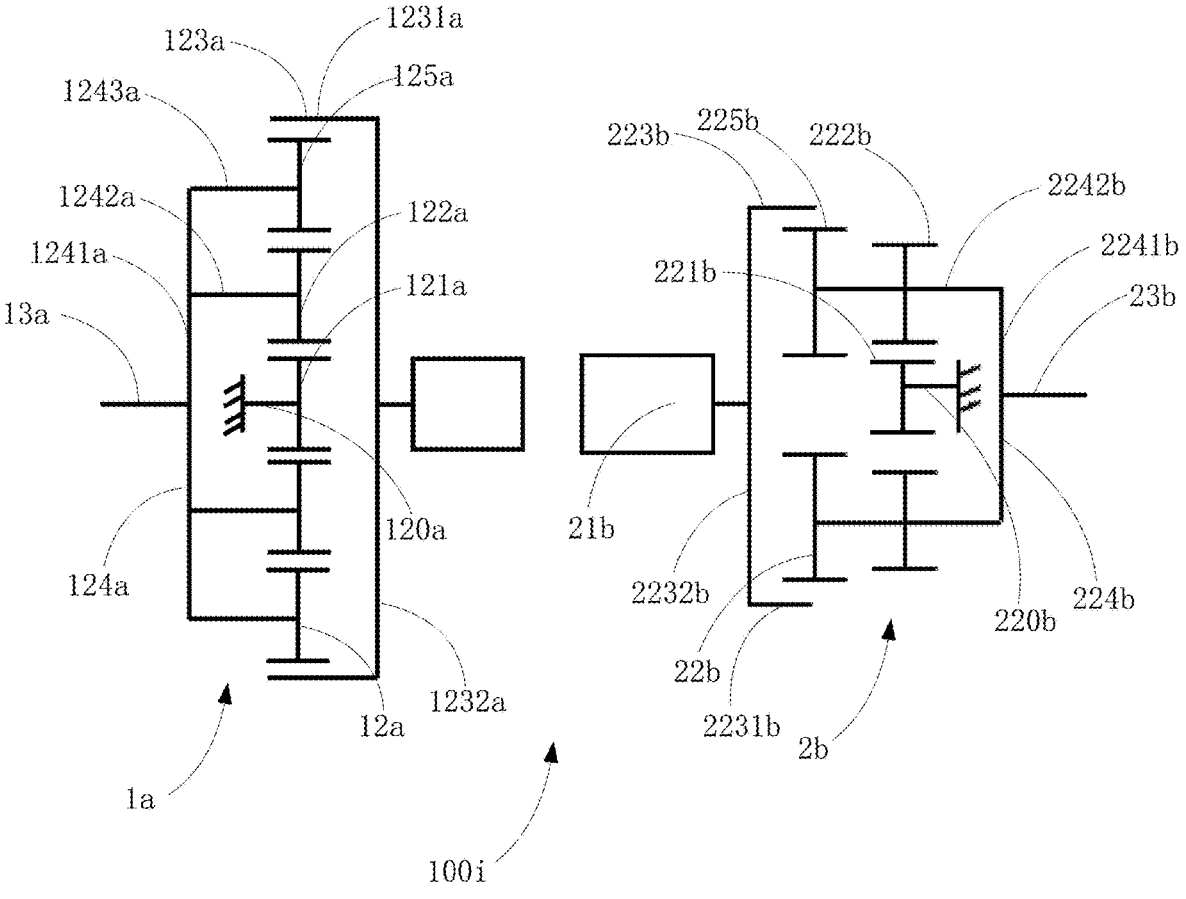
FIG. 10 is a schematic view of a double-motor electric drive assembly according to a tenth embodiment of the present disclosure.

As illustrated in FIG. 10, FIG. 10 illustrates a structure of a double-motor electric drive assembly 100i according to the tenth embodiment. The double-motor electric drive assembly 100i is mounted on a vehicle and provides the vehicle with driving power. The vehicle may be a pure electric vehicle.

The double-motor electric drive assembly 100i includes a first drive mechanism 1a and a second drive mechanism 2b. The first drive mechanism 1a and the second drive mechanism 2b may be provided at one drive axle.

The first drive mechanism 1a includes a first motor 11a, a first planetary gear mechanism 12a, and a first half shaft 13a. The first planetary gear mechanism 12a is provided between the first half shaft 13a and the first motor 11a. A main shaft of the first motor 11a is connected to the first planetary gear mechanism 12a, and the first planetary gear mechanism 12a is connected to the first half shaft 13a. The first planetary gear mechanism 12a may be a speed reducer. After reducing a speed of a torque outputted by the first motor 11a and increasing the outputted torque, the first planetary gear mechanism 12a may transmit the torque to the first half shaft 13a to drive the first half shaft 13a to rotate.

The second drive mechanism 2b includes a second motor 21b, a second planetary gear mechanism 22b, and a second half shaft 23b. The second planetary gear mechanism 22b is provided between the second half shaft 23b and the second motor 21b. A main shaft of the second motor 21b is connected to the second planetary gear mechanism 22b, and the second planetary gear mechanism 22b is connected to the second half shaft 23b. The second planetary gear mechanism 22b may be a speed reducer. After reducing a speed of a torque outputted by the second motor 21b and increasing the outputted torque, the second planetary gear mechanism 22b may transmit the torque to the second half shaft 23b to drive the second half shaft 23b to rotate.

The first motor 11a and the second motor 21b are provided between the first planetary gear mechanism 12a and the second planetary gear mechanism 22b. The first half shaft 13a is provided at a side of the first planetary gear mechanism 12a facing away from the second planetary gear mechanism 22b, and the second half shaft 23b is provided at a side of the second planetary gear mechanism 22b facing away from the first planetary gear mechanism 12a. The first half shaft 13a, the second half shaft 23b, the main shaft of the first motor 11a, and the main shaft of the second motor 21b are arranged coaxially.

In this embodiment, the first planetary gear mechanism 12a is constructed as a longitudinal double-row planetary gear mechanism. The first planetary gear mechanism 12a includes a first sun gear 121a, a first planetary gear 122a, a second planetary gear 125a, a first inner gear ring 123a, a first planetary carrier 124a, and a sun gear rotary shaft 120a. The first inner gear ring 123a is arranged coaxially with the main shaft of the first motor 11a. The first inner gear ring 123a includes a connector 1232a and a gear ring body 1231a. The connector 1232a is provided at an end of the gear ring body 1231a close to the first motor 11a. The connector 1232a is connected to the gear ring body 1231a and the main shaft of the first motor 11a. The sun gear rotary shaft 120a is provided in the first inner gear ring 123a and arranged coaxially with the first inner gear ring 123a. The first sun gear 121a is provided in the first inner gear ring 123a, and is coaxially arranged with the first inner gear ring 123a. Further, the first sun gear 121a is fixedly sleeved over the sun gear rotary shaft 120a. The first sun gear 121 is unable to rotate around the sun gear rotary shaft 120a. There is an annular gap between the first sun gear 121a and the first inner gear ring 123a. Each of the first planetary gear 122a and the second planetary gear 125a is provided in the annular gap between the first sun gear 121a and the first inner gear ring 123a. Axes of the first planetary gear 122a and the second planetary gear 125a are both parallel to an axis of the first sun gear 121a. A plurality of first planetary gears 122a may be provided. For example, three first planetary gears 122a may be provided. The plurality of first planetary gears 122a are evenly distributed in a circumferential direction of the first sun gear 121a. The plurality of first planetary gears 122a are engaged with the first sun gear 121a. The number of second planetary gears 125a is the same as the number of first planetary gears 122a. The first planetary gears 122a are in one-to-one correspondence with the second planetary gears 125a. Each of the second planetary gears 125a is engaged with one of the first planetary gears 122a corresponding to the second planetary gear 125a and is engaged with the first inner gear ring 123a.

The first planetary carrier 124a includes a first support 1241a, a first rotary shaft 1242a, and a second rotary shaft 1243a. The first support 1241a is provided at a side of the first sun gear 121a facing away from the first motor 11a. Each of the first rotary shaft 1242a and the second rotary shaft 1243a is parallel to the axis of the first sun gear 121a. Each of an end of the first rotary shaft 1242a and an end of the second rotary shaft 1243a is connected to the first support 1241a. The number of first rotary shafts 1242a is the same as the number of first planetary gears 122a. The first rotary shafts 1242a are in one-to-one correspondence with the first planetary gears 122a. Each of the first planetary gears 122a is sleeved over one of the first rotary shafts 1242a corresponding to the first planetary gear 122a and is rotatable around the first rotary shaft 1242a. The number of second rotary shafts 1243a is the same as the number of second planetary gears 125a. The second rotary shafts 1243a are in one-to-one correspondence with the second planetary gears 125a. Each of the second planetary gears 125a is sleeved over one of the second rotary shaft 1243a corresponding to the second planetary gear 125a and is rotatable around the second rotary shaft 1243a. The first half shaft 13a is provided at a side of the first support 1241a facing away from the first sun gear 121a and is arranged coaxially with the first sun gear 121a. An end of the first half shaft 13a is connected to the first support 1241a of the first planetary carrier 124a.

A torque outputted by the main shaft of the first motor 11a passes through the first sun gear 121a, the first planetary gear 122a, the second planetary gear 125a, the first inner gear ring 123a, and the first planetary carrier 124a sequentially, and is transmitted to the first half shaft 13a to drive the first half shaft 13a to rotate.

In this embodiment, the second planetary gear mechanism 22b is constructed as a transverse double-row planetary gear mechanism. The second planetary gear mechanism 22b includes a second sun gear 221b, a third planetary gear 222b, a fourth planetary gear 225b, a second inner gear ring 223b, a second planetary carrier 224b, and a sun gear rotary shaft 220b. The second inner gear ring 223b is arranged coaxially with the main shaft of the second motor 21b. The second inner gear ring 223b includes a connector 2232b and a gear ring body 2231b.

The connector 2232b is provided at an end of the gear ring body 2231b. The connector 2232b is connected to the gear ring body 2231b and the main shaft of the second motor 21b, respectively. The connector 2232b may be provided at an end of the gear ring body 2231b. The sun gear rotary shaft 220b is provided at a side of the second inner gear ring 223b facing away from the second motor 21b and is coaxially arranged with the second inner gear ring 223b. The sun gear rotary shaft 220b is disposed to remain stationary. The second sun gear 221b is fixedly sleeved over the sun gear rotary shaft 220b and is unable to rotate around the sun gear rotary shaft 220b. In this way, the second sun gear 221b is provided at the side of the second inner gear ring 223b facing away from the second motor 21b, and is coaxially arranged with the second inner gear ring 223b. Further, the second sun gear 221b has an outer diameter smaller than an inner diameter of the second inner gear ring 223b.

Axes of the third planetary gear 222b and the fourth planetary gear 225b are both parallel to an axis of the second sun gear 221b. A plurality of third planetary gears 222b may be provided. For example, three third planetary gears 222b may be provided. The plurality of third planetary gears 222b are evenly distributed in a circumferential direction of the second sun gear 221b. Each of the plurality of third planetary gears 222b is engaged with the second sun gear 221b. The fourth planetary gear 225b is provided at an inner side of the second inner gear ring 223b. The number of fourth planetary gears 225b is the same as the number of third planetary gears 222b. The third planetary gears 222b are in one-to-one correspondence with the fourth planetary gears 225b. Each of the fourth planetary gears 225b is provided in the second inner gear ring 223b. Each of the fourth planetary gears 225b is arranged coaxially with one of the third planetary gears 222b corresponding to the fourth planetary gear 225b, and is engaged with the second inner gear ring 223b. The third planetary gear 222b has a greater outer diameter than the fourth planetary gear 225b.

The second planetary carrier 224b includes a second support 2241b and a second rotary shaft 2242b. The second support 2241b is provided at a side of the third planetary gear 222b facing away from the fourth planetary gear 225b. The second rotary shaft 2242b is parallel to the axis of the second sun gear 221b and has an end connected to the second support 2241b. The number of second rotary shafts 2242b is the same as the number of third planetary gears 222b. The second rotary shafts 2242b are in one-to-one correspondence with the third planetary gears 222b. The second rotary shafts 2242b are in one-to-one correspondence with the fourth planetary gears 225b. Each of the third planetary gears 222b is sleeved over one of the second rotary shafts 2242b corresponding to the third planetary gear 222b and is rotatable around the second rotary shaft 2242b. Each of the fourth planetary gears 225b is sleeved over one of the second rotary shafts 2242b corresponding to the fourth planetary gear 225b and is rotatable around the second rotary shaft 2242b. The second half shaft 23b is provided at a side of the second support 2241b facing away from the second sun gear 221b and is arranged coaxially with the second sun gear 221b. An end of the second half shaft 23b is connected to the second support 2241b of the second planetary carrier 224b.

A torque outputted by the main shaft of the second motor 21b is transmitted to the second half shaft 23b by the second planetary gear mechanism 22b to drive the second half shaft 23b to rotate.

Since the first planetary gear mechanism 12a is the longitudinal double-row planetary gear, and the second planetary gear mechanism 22b is the transverse double-row planetary gear mechanism, transmission ratios of both the first planetary gear mechanism 12a and the second planetary gear mechanism 22b are greater than a transmission ratio of a single-row planetary gear mechanism. Meanwhile, the second planetary gear mechanism 22b constructed as the transverse double-row planetary gear mechanism has a smaller radial size than the first planetary gear mechanism 12a constructed as the longitudinal double-row planetary gear mechanism.

Since the first planetary gear mechanism 12a is the longitudinal double-row planetary gear, and the second planetary gear mechanism 22b the is transverse double-row planetary gear mechanism, the first planetary gear mechanism 12a has a different gear arrangement pattern from the second planetary gear mechanism 22b, and transmission paths of torques of the first planetary gear mechanism 12a and the second planetary gear mechanism 22b are different. In this way, an order separation of the first planetary gear mechanism 12a and the second planetary gear mechanism 22b can be realized, thereby avoiding an order overlap of the first planetary gear mechanism 12a and the second planetary gear mechanism 22b. As a result, order noise when the first planetary gear mechanism 12 and the second planetary gear mechanism 22a operate simultaneously can be significantly reduced, improving NVH performance of the vehicle and obtaining a better driving experience.

Meanwhile, the first motor 11a and the second motor 21b may each be a motor with low power. When the first motor 11a and the second motor 21b operate simultaneously, the double-motor electric drive assembly 100i may output larger power to satisfy high-power output requirements of the vehicle. Since the first motor 11a and the second motor 21b may be controlled separately, power output at a side or two sides of the vehicle may be changed as power requirements, to realize functions of vehicle differential speed, differential lock, vector control, and the like, making control more accurate. For example, by respectively controlling rotational speeds and torques of the first motor 11a and the second motor 21a, differential speed and torque distribution between vehicle wheels may be realized, allowing for straight traveling of the vehicle.

In an exemplary embodiment, the number of teeth of the first sun gear 121a of the first planetary gear mechanism 12a is different from the number of teeth of the second sun gear 221b of the second planetary gear mechanism 22b.

The number of teeth of the first planetary gear 122a of the first planetary gear mechanism 12a is different from each of the number of teeth of the third planetary gear 222b and the number of teeth of the fourth planetary gear 225b of the second planetary gear mechanism 22b.

The number of teeth of the second planetary gear 125a of the first planetary gear mechanism 12a is different from each of the number of teeth of the third planetary gear 222b and the number of teeth of the fourth planetary gear 225b of the second planetary gear mechanism 22b.

In this way, numbers of teeth of sun gears and/or planetary gears between the first planetary gear mechanism 12a and the second planetary gear mechanism 22b are different. Therefore, order noise when the first planetary gear mechanism 12a and the second planetary gear mechanism 22b operate simultaneously can be further reduced, improving the NVH performance of the vehicle and obtaining the better driving experience.

Embodiments of the present disclosure is exemplary rather than restrictive. In addition, it is obvious for those of ordinary skill in the art that there may be many more embodiments and realization solutions within the scope of the embodiments described in the present disclosure. Although many possible combinations of features are illustrated in the drawings and discussed in the detailed implementations, many other combinations of the disclosed features are also possible. Unless specifically limited, any feature or element of any embodiment may be used in combination with, or may be substituted for, any other feature or element of any other embodiment.

The present disclosure includes and contemplates combinations with features and elements known to those of ordinary skill in the art. The embodiments, features, and elements already disclosed in the present disclosure may also be combined with any conventional features or elements, to form the unique inventive solutions defined by the claims. Any feature or element of any embodiment may also be combined with features or elements from other inventive embodiments to form another unique inventive embodiment defined by the claims. Therefore, it should be understood that any of the features shown and/or discussed in the present disclosure may be implemented alone or in any suitable combination. Therefore, the embodiments are not subject to any restrictions other than those made pursuant to the attached claims and their equivalent substitutions. In addition, various modifications and changes may be made within the scope of the attached claims.

In addition, when describing a representative embodiment, the specification may have presented the method and/or process as a particular sequence of steps. However, the method or process should not be limited to steps in a particular order as described herein, without relying on the particular order of the steps described herein. As understood by those of ordinary skill in the art, other step sequences are possible. Therefore, the specific order of the steps set forth in the specification should not be construed as limiting the claims. In addition, the claims for this method and/or process should not be limited to the steps in which they are performed in the described order. Those skilled in the art may readily understand that these orders may be varied and still be within the spirit and scope of the embodiments of the present disclosure.

What is claimed is:

1. A double-motor electric drive assembly, comprising:
a first drive mechanism and a second drive mechanism that are located at one drive axle, wherein:
the first drive mechanism comprises a first motor, a first planetary gear mechanism, and a first half shaft that are connected sequentially; and
the second drive mechanism comprises a second motor, a second planetary gear mechanism, and a second half shaft that are connected sequentially,
wherein the first planetary gear mechanism has a different structure from the second planetary gear mechanism,
wherein gears of the first planetary gear mechanism are arranged with respect to gears of the second planetary gear mechanism in a positionally symmetrical manner about a longitudinal central axis perpendicular to an extending direction of the drive axle; and
the first motor is connected to one of the gears of the first planetary gear mechanism, and the second motor is connected to one of the gears of the second planetary gear mechanism, the one gear of the first planetary gear mechanism being arranged with respect to the one gear of the second planetary gear mechanism in a positionally dissymmetric manner.

2. The double-motor electric drive assembly according to claim 1, wherein:
an inner gear ring of the first planetary gear mechanism is connected to a main shaft of the first motor; and
a sun gear of the second planetary gear mechanism is connected to a main shaft of the second motor.

3. The double-motor electric drive assembly according to claim 1, wherein:
the first half shaft is arranged coaxially with the second half shaft;
the first planetary gear mechanism comprises:
a first inner gear ring arranged coaxially with the first half shaft and connected to a main shaft of the first motor;
a first sun gear stationarily provided in the first inner gear ring and arranged coaxially with the first inner gear ring;

a first planetary gear engaged with the first inner gear ring and the first sun gear; and
a first planetary carrier comprising a first support fixedly connected to the first half shaft and a first rotary shaft connected to the first support, the first planetary gear being sleeved over the first rotary shaft; and
the second planetary gear mechanism comprises:
a second inner gear ring arranged coaxially with the second half shaft and disposed to remain stationary;
a second sun gear provided in the second inner gear ring, the second sun gear being arranged coaxially with the second inner gear ring and sleeved over a main shaft of the second motor;
a second planetary gear engaged with the second inner gear ring and the second sun gear; and
a second planetary carrier comprising a second support fixedly connected to the second half shaft and a second rotary shaft connected to the second support, the second planetary gear being sleeved over the second rotary shaft.

4. The double-motor electric drive assembly according to claim 1, wherein:
the first half shaft is arranged coaxially with the second half shaft;
the first planetary gear mechanism comprises:
a first inner gear ring arranged coaxially with the first half shaft and connected to a main shaft of the first motor;
a first sun gear stationarily provided in the first inner gear ring and arranged coaxially with the first inner gear ring;
a first planetary gear provided between the first sun gear and the first inner gear ring and engaged with the first sun gear;
a second planetary gear provided between the first sun gear and the first inner gear ring and engaged with the first inner gear ring and the first planetary gear; and
a first planetary carrier comprising a first support, a first rotary shaft, and a second rotary shaft, the first support being fixedly connected to the first half shaft, the first rotary shaft and the second rotary shaft being each connected to the first support, the first planetary gear being sleeved over the first rotary shaft, and the second planetary gear being sleeved over the second rotary shaft; and
the second planetary gear mechanism comprises:
a second inner gear ring arranged coaxially with the second half shaft and disposed to remain stationary;
a second sun gear provided in the second inner gear ring and arranged coaxially with the second inner gear ring, the second sun gear being sleeved over a main shaft of the second motor;
a third planetary gear provided between the second sun gear and the second inner gear ring and engaged with the second sun gear;
a fourth planetary gear provided between the second sun gear and the second inner gear ring and engaged with the second inner gear ring and the third planetary gear; and
a second planetary carrier comprising a second support, a third rotary shaft, and a fourth rotary shaft, the second support being fixedly connected to the second half shaft, the third rotary shaft and the fourth rotary shaft being each connected to the second support, the third planetary gear being sleeved over the third rotary shaft, and the fourth planetary gear being sleeved over the fourth rotary shaft.

5. The double-motor electric drive assembly according to claim 1, wherein:

the first half shaft is arranged coaxially with the second half shaft;

the first planetary gear mechanism comprises:

a first sun gear sleeved over a main shaft of the first motor and arranged coaxially with the first half shaft;

a first inner gear ring provided at a side of the first sun gear close to the first motor, the first inner gear ring being disposed to remain stationary;

a first planetary gear engaged with the first sun gear;

a second planetary gear engaged with the first inner gear ring; and a first planetary carrier comprising a first support fixedly connected to the first half shaft and a first rotary shaft connected to the first support, the first planetary gear and the second planetary gear being sleeved over the first rotary shaft; and the second planetary gear mechanism comprises:

a second inner gear ring arranged coaxially with the second half shaft and connected to the second motor;

a second sun gear stationarily provided at a side of the second inner gear ring facing away from the second motor and arranged coaxially with the second inner gear ring;

a third planetary gear engaged with the second sun gear;

a fourth planetary gear engaged with the second inner gear ring; and a second planetary carrier comprising a second support fixedly connected to the second half shaft and a second rotary shaft connected to the second support, the third planetary gear and the fourth planetary gear being sleeved over the second rotary shaft.

6. The double-motor electric drive assembly according to claim 5, wherein a plurality of first planetary gears, a plurality of second planetary gears, a plurality of third planetary gears, a plurality of fourth planetary gears, a plurality of first rotary shafts, and a plurality of second rotary shafts are provided, wherein the plurality of first planetary gears comprise the first planetary gear, the plurality of second planetary gears comprise the second planetary gear, the plurality of third planetary gears comprise the third planetary gear, the plurality of fourth planetary gears comprise the fourth planetary gear, the plurality of first rotary shafts comprise the first rotary shaft, and the plurality of second rotary shafts comprise the second rotary shaft, wherein:

the plurality of first planetary gears are uniformly distributed in a circumferential direction of the first sun gear;

the plurality of second planetary gears are in one-to-one correspondence with the plurality of first planetary gears, wherein each of the plurality of second planetary gears and one of the plurality of first planetary gears corresponding to the second planetary gear are sleeved over one of the plurality of first rotary shafts;

the plurality of third planetary gears are uniformly distributed in a circumferential direction of the second sun gear, and the plurality of fourth planetary gears are in one-to-one correspondence with the plurality of third planetary gears, wherein each of the plurality of fourth planetary gears and one of the plurality of third planetary gears corresponding to the fourth planetary gear are sleeved over one of the plurality of second rotary shafts.

7. The double-motor electric drive assembly according to claim 1, wherein:

the first half shaft is arranged coaxially with the second half shaft;

the first planetary gear mechanism comprises:

a first sun gear sleeved over a main shaft of the first motor and arranged coaxially with the first half shaft;

a second sun gear stationarily disposed at a side of the first sun gear facing away from the first motor and arranged coaxially with the first sun gear;

a first planetary gear engaged with the first sun gear;

a second planetary gear engaged with the second sun gear; and a first planetary carrier comprising a first support fixedly connected to the first half shaft and a first rotary shaft connected to the first support, the first planetary gear and the second planetary gear being sleeved over the first rotary shaft; and the second planetary gear mechanism comprises:

a third sun gear arranged coaxially with the second half shaft and disposed to remain stationary, wherein the third sun gear has a through hole, the through hole being configured to allow a main shaft of the second motor to pass through the through hole, and the main shaft of the second motor being in a clearance fit with the through hole;

a fourth sun gear sleeved over the main shaft of the second motor and provided at a side of the third sun gear facing away from the second motor;

a third planetary gear engaged with the third sun gear;

a fourth planetary gear engaged with the fourth sun gear; and a second planetary carrier comprising a second support fixedly connected to the second half shaft and a second rotary shaft connected to the second support, the third planetary gear and the fourth planetary gear being sleeved over the second rotary shaft.

8. The double-motor electric drive assembly according to claim 5, wherein the first half shaft, the first planetary gear mechanism, the first motor, the second motor, the second planetary gear mechanism, and the second half shaft are coaxially arranged sequentially.

9. A vehicle, comprising the double-motor electric drive assembly according to claim 1.

10. The vehicle according to claim 9, wherein;

an inner gear ring of the first planetary gear mechanism is connected to a main shaft of the first motor; and a sun gear of the second planetary gear mechanism is connected to a main shaft of the second motor.

11. The vehicle according to claim 9, wherein:

the first half shaft is arranged coaxially with the second half shaft;

the first planetary gear mechanism comprises:

a first inner gear ring arranged coaxially with the first half shaft and connected to a main shaft of the first motor;

a first sun gear stationarily provided in the first inner gear ring and arranged coaxially with the first inner gear ring;

a first planetary gear engaged with the first inner gear ring and the first sun gear; and a first planetary carrier comprising a first support fixedly connected to the first half shaft and a first rotary shaft connected to the first support, the first planetary gear being sleeved over the first rotary shaft; and the second planetary gear mechanism comprises:

a second inner gear ring arranged coaxially with the second half shaft and disposed to remain stationary;

a second sun gear provided in the second inner gear ring, the second sun gear being arranged coaxially with the second inner gear ring and sleeved over a main shaft of the second motor;

a second planetary gear engaged with the second inner gear ring and the second sun gear; and a second planetary carrier comprising a second support fixedly connected to the second half shaft and a second rotary shaft connected to the second support, the second planetary gear being sleeved over the second rotary shaft.

12. The vehicle according to claim 9, wherein:

the first half shaft is arranged coaxially with the second half shaft;

the first planetary gear mechanism comprises:

a first inner gear ring arranged coaxially with the first half shaft and connected to a main shaft of the first motor;

a first sun gear stationarily provided in the first inner gear ring and arranged coaxially with the first inner gear ring;

a first planetary gear provided between the first sun gear and the first inner gear ring and engaged with the first sun gear;

a second planetary gear provided between the first sun gear and the first inner gear ring and engaged with the first inner gear ring and the first planetary gear; and a first planetary carrier comprising a first support, a first rotary shaft, and a second rotary shaft, the first support being fixedly connected to the first half shaft, the first rotary shaft and the second rotary shaft being each connected to the first support, the first planetary gear being sleeved over the first rotary shaft, and the second planetary gear being sleeved over the second rotary shaft; and the second planetary gear mechanism comprises:

a second inner gear ring arranged coaxially with the second half shaft and disposed to remain stationary;

a second sun gear provided in the second inner gear ring and arranged coaxially with the second inner gear ring, the second sun gear being sleeved over a main shaft of the second motor;

a third planetary gear provided between the second sun gear and the second inner gear ring and engaged with the second sun gear;

a fourth planetary gear provided between the second sun gear and the second inner gear ring and engaged with the second inner gear ring and the third planetary gear; and a second planetary carrier comprising a second support, a third rotary shaft, and a fourth rotary shaft, the second support being fixedly connected to the second half shaft, the third rotary shaft and the fourth rotary shaft being each connected to the second support, the third planetary gear being sleeved over the third rotary shaft, and the fourth planetary gear being sleeved over the fourth rotary shaft.

13. The vehicle according to claim 9, wherein:

the first half shaft is arranged coaxially with the second half shaft;

the first planetary gear mechanism comprises:

a first sun gear sleeved over a main shaft of the first motor and arranged coaxially with the first half shaft;

a first inner gear ring provided at a side of the first sun gear close to the first motor, the first inner gear ring being disposed to remain stationary;

a first planetary gear engaged with the first sun gear;

a second planetary gear engaged with the first inner gear ring; and a first planetary carrier comprising a first support fixedly connected to the first half shaft and a first rotary shaft connected to the first support, the first planetary gear and the second planetary gear being sleeved over the first rotary shaft; and the second planetary gear mechanism comprises:

a second inner gear ring arranged coaxially with the second half shaft and connected to the second motor;

a second sun gear stationarily provided at a side of the second inner gear ring facing away from the second motor and arranged coaxially with the second inner gear ring;

a third planetary gear engaged with the second sun gear;

a fourth planetary gear engaged with the second inner gear ring; and a second planetary carrier comprising a second support fixedly connected to the second half shaft and a second rotary shaft connected to the second support, the third planetary gear and the fourth planetary gear being sleeved over the second rotary shaft.

14. The vehicle according to claim 13, wherein a plurality of first planetary gears, a plurality of second planetary gears, a plurality of third planetary gears, a plurality of fourth planetary gears, a plurality of first rotary shafts, and a plurality of second rotary shafts are provided, wherein the plurality of first planetary gears comprise the first planetary gear, the plurality of second planetary gears comprise the second planetary gear, the plurality of third planetary gears comprise the third planetary gear, the plurality of fourth planetary gears comprise the fourth planetary gear, the plurality of first rotary shafts comprise the first rotary shaft, and the plurality of second rotary shafts comprise the second rotary shaft, wherein:

the plurality of first planetary gears are uniformly distributed in a circumferential direction of the first sun gear;

the plurality of second planetary gears are in one-to-one correspondence with the plurality of first planetary gears, wherein each of the plurality of second planetary gears and one of the plurality of first planetary gears corresponding to the second planetary gear are sleeved over one of the plurality of first rotary shafts;

the plurality of third planetary gears are uniformly distributed in a circumferential direction of the second sun gear; and the plurality of fourth planetary gears are in one-to-one correspondence with the plurality of third planetary gears, wherein each of the plurality of fourth planetary gears and one of the plurality of third planetary gears corresponding to the fourth planetary gear are sleeved over one of the plurality of second rotary shafts.

15. The vehicle according to claim 13, wherein the first half shaft, the first planetary gear mechanism, the first motor, the second motor, the second planetary gear mechanism, and the second half shaft are coaxially arranged sequentially.

16. The vehicle according to claim 9, wherein:

the first half shaft is arranged coaxially with the second half shaft;

the first planetary gear mechanism comprises:

a first sun gear sleeved over a main shaft of the first motor and arranged coaxially with the first half shaft;

a second sun gear stationarily disposed at a side of the first sun gear facing away from the first motor and arranged coaxially with the first sun gear;

a first planetary gear engaged with the first sun gear;

a second planetary gear engaged with the second sun gear; and a first planetary carrier comprising a first support fixedly connected to the first half shaft and a first rotary shaft connected to the first support, the first planetary gear and the second planetary gear being sleeved over the first rotary shaft; and the second planetary gear mechanism comprises:

a third sun gear arranged coaxially with the second half shaft and disposed to remain stationary, wherein the third sun gear has a through hole, the through hole being configured to allow a main shaft of the second motor to pass through the through hole, and the main shaft of the second motor being in a clearance fit with the through hole;

a fourth sun gear sleeved over the main shaft of the second motor and provided at a side of the third sun gear facing away from the second motor;

a third planetary gear engaged with the third sun gear;

a fourth planetary gear engaged with the fourth sun gear; and a second planetary carrier comprising a second support fixedly connected to the second half shaft and a second rotary shaft connected to the second support, the third planetary gear and the fourth planetary gear being sleeved over the second rotary shaft.

* * * * *